(12) United States Patent
Eng et al.

(10) Patent No.: US 11,845,454 B2
(45) Date of Patent: Dec. 19, 2023

(54) OPERATIONAL ENVELOPE DETECTION WITH SITUATIONAL ASSESSMENT

(71) Applicant: Motional AD LLC, Boston, MA (US)

(72) Inventors: You Hong Eng, Singapore (SG); James Guo Ming Fu, Singapore (SG); Scott D. Pendleton, Singapore (SG); Yu Pan, Singapore (SG)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 17/475,286

(22) Filed: Sep. 14, 2021

(65) Prior Publication Data
US 2023/0081111 A1 Mar. 16, 2023

(51) Int. Cl.
*B60W 50/00* (2006.01)
*B60W 50/035* (2012.01)
*B60W 60/00* (2020.01)
*B60W 50/02* (2012.01)

(52) U.S. Cl.
CPC ...... *B60W 50/035* (2013.01); *B60W 50/0205* (2013.01); *B60W 60/0015* (2020.02); *B60W 60/0013* (2020.02); *B60W 2050/0215* (2013.01); *B60W 2555/20* (2020.02)

(58) Field of Classification Search
CPC .......... B60W 50/035; B60W 50/0205; B60W 60/0015; B60W 60/0013; B60W 2050/0215; B60W 2555/20
See application file for complete search history.

(56) References Cited

U.S. PATENT DOCUMENTS

| 10,431,018 | B1 | 10/2019 | Fields et al. |
| 10,832,502 | B2 | 11/2020 | Levinson et al. |
| 11,320,826 | B2* | 5/2022 | Vora .................. G08G 1/166 |
| 11,378,956 | B2 | 7/2022 | Zhang et al. |
| 2016/0266581 | A1 | 9/2016 | Dolgov et al. |

(Continued)

FOREIGN PATENT DOCUMENTS

| EP | 3693244 | 8/2020 |
| JP | 2017054440 | 3/2017 |

(Continued)

OTHER PUBLICATIONS

[No Author Listed], "Surface Vehicle Recommended Practice: Taxonomy and Definitions for Terms Related to Driving Automation Systems for On-Road Motor Vehicles," SAE International, Standard J3016, Sep. 30, 2016, 30 pages.

(Continued)

*Primary Examiner* — Ian Jen
(74) *Attorney, Agent, or Firm* — Fish & Richardson P.C.

(57) ABSTRACT

Embodiments for operational envelope detection (OED) with situational assessment are disclosed. Embodiments herein relate to an operational envelope detector that is configured to receive, as inputs, information related to sensors of the system and information related to operational design domain (ODD) requirements. The OED then compares the information related to sensors of the system to the information related to the ODD requirements, and identifies whether the system is operating within its ODD or whether a remedial action is appropriate to adjust the ODD requirements based on the current sensor information. Other embodiments are described and/or claimed.

20 Claims, 16 Drawing Sheets

(56) References Cited

U.S. PATENT DOCUMENTS

| | | |
|---|---|---|
| 2017/0351261 A1 | 12/2017 | Levinson et al. |
| 2018/0057001 A1 | 3/2018 | Hu et al. |
| 2018/0329418 A1 | 11/2018 | Baalke et al. |
| 2019/0018421 A1 | 1/2019 | Frazzoli et al. |
| 2019/0019349 A1 | 1/2019 | Dolgov et al. |
| 2019/0079528 A1 | 3/2019 | Zhu et al. |
| 2019/0185018 A1 | 6/2019 | Tao et al. |
| 2019/0236862 A1 | 8/2019 | Mercep et al. |
| 2019/0384312 A1 | 12/2019 | Herbach |
| 2020/0108808 A1 | 4/2020 | Zhou et al. |
| 2020/0262444 A1 | 8/2020 | Kong et al. |
| 2021/0018916 A1 | 1/2021 | Thakur et al. |
| 2021/0046924 A1 | 2/2021 | Caldwell et al. |
| 2021/0133466 A1 | 5/2021 | Gier et al. |
| 2021/0139048 A1 | 5/2021 | Russell et al. |
| 2022/0212679 A1 | 7/2022 | Winther et al. |
| 2022/0223039 A1 | 7/2022 | Nagura |
| 2022/0388536 A1 | 12/2022 | Kothbauer et al. |
| 2023/0078779 A1 | 3/2023 | Eng et al. |
| 2023/0091987 A1 | 3/2023 | Pendleton et al. |
| 2023/0093601 A1 | 3/2023 | Pendleton et al. |

FOREIGN PATENT DOCUMENTS

| | | |
|---|---|---|
| KR | 10-2020-0129045 | 11/2020 |
| WO | WO 2018/217498 | 11/2018 |
| WO | WO 2019/089015 | 5/2019 |
| WO | WO 2020/264007 | 12/2020 |

OTHER PUBLICATIONS

Reschka et al., "Conditions for a safe state of automated road vehicles," it—Information Technology, Aug. 2015, 57(4):215-22.

* cited by examiner

OPERATIONAL ENVELOPE DETECTION WITH SITUATIONAL ASSESSMENT

BACKGROUND

An operational design domain (ODD) for an autonomous vehicle (AV) is the specific conditions under which the AV is designed to function. The ODD can be based on a variety of conditions (e.g., the location of the AV, the speed at which the AV needs to travel, etc.) Operation of AVs can be constrained based on the ODD in which the AV is configured to operate.

DETAILED DESCRIPTION

Figure 1:
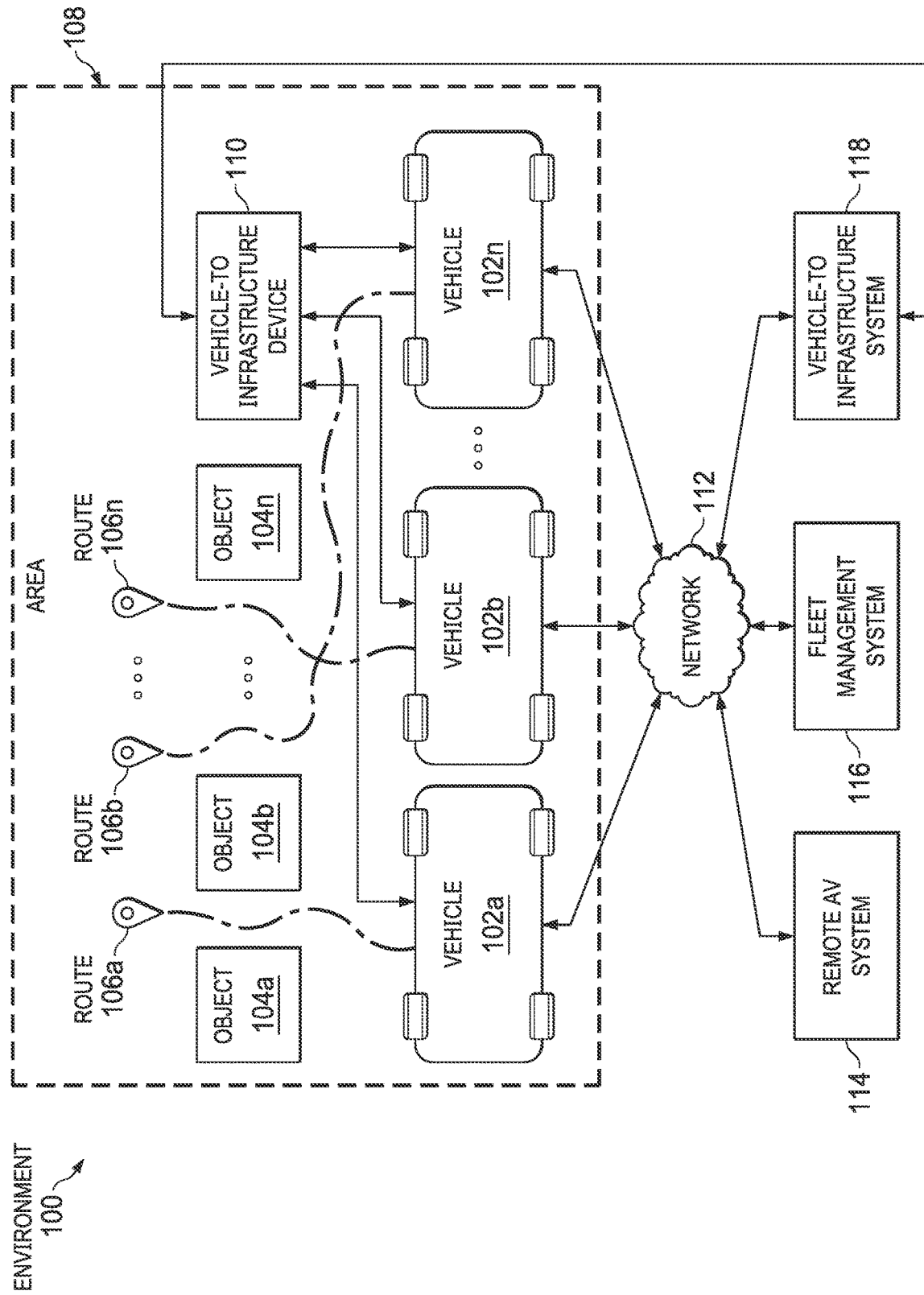
FIG. 1 is an example environment in which a vehicle including one or more components of an autonomous system can be implemented, in accordance with various embodiments.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Some embodiments of the present disclosure are described in connection with a threshold. As described herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement an autonomous system that has an ODD in which the autonomous system is designed to function. Embodiments herein relate to an OED framework that is configured to receive, as inputs, data related to sensors of the autonomous system and data related to ODD requirements. The OED then compares the data related to sensors of the autonomous system to the data related to the ODD requirements, and identifies whether the autonomous system is operating within its ODD or whether a remedial action is appropriate to adjust the ODD requirements based on the current sensor data.

In another aspect and/or embodiment, systems, methods, and computer program products described herein include or relate to a perception system of the autonomous system that identifies visibility-related factors related to one or more of the sensors, such as environmental conditions that would affect the sensors, detected sensor occlusion (e.g., by an object within the path of the sensor), blockage of the sensor, etc. The perception system uses these factors to generate a perception visibility model (PVM) related to the sensor detection capabilities. Based on the PVM, the perception system generates one or more maps. One such map is an occlusion map that indicates where an object is located that is occluding the sensors. Another such map is a PoD map related to the likelihood of a sensor being able to detect the presence of an object in a given location. In one embodiment, the PVM model, or portions thereof, is iterated toward a default model at pre-identified time intervals, if new data related to the sensors is not received by the perception system.

In another aspect and/or embodiment, systems, methods, and computer program products described herein include and/or implement an OED framework for an autonomous system, and more particularly to situation assessment using metrics (SAM) component of the OED framework. The SAM component attempts to understand a trajectory that a vehicle with an autonomous system is traversing in a given environment in a particular driving scenario and validate whether behavioral requirements for the vehicle are met for the particular driving scenario. In an embodiment, the processing pipeline of the SAM component includes two subsystems: a maneuver assessment subsystem and an anomaly detection subsystem.

In another aspect and/or embodiment, the maneuver assessment subsystem receives a trajectory from a planner/controller system, current and predicted "world" states (e.g., agent data, traffic light status), map data and a goal assignment (e.g., a particular destination). The maneuver assessment subsystem outputs a compliance analysis for well-defined situations (e.g., driving scenarios for which there are specified rules), a detection result for ill-defined situations (e.g., driving scenarios for which there are no specified rules) and an updated requirement on the perception system. Some examples of maneuver assessment include "gap" analysis to check if the vehicle maintains a safe gap/distance with other agents (e.g., other vehicles) in the environment when performing a lane change maneuver. Another example is a "region of interest" compliance where a minimum required perception zone (e.g., the field of view provided by the vehicle's suite of sensors) for the vehicle is required to perform a safe maneuver.

In another aspect and/or embodiment, the anomaly detection subsystem receives as input the ill-defined situation detection and planner/controller system internal states. The anomaly detection subsystem outputs contextual data related to the stopping-reason to assist assignment of an appropriate intervention (e.g., remote vehicle assistance). Some examples of anomaly detection include unusual road traffic scenarios, such as a traffic accident, construction zone, other road users breaking precedence (e.g., a jaywalker, beating a red light). Another example is "stuck" detection where the vehicle is in, or will soon enter, an unresolvable state of immobility, which will require remote intervention.

In other aspects and/or embodiments, when the vehicle becomes "stuck" (e.g., immobile for an extended duration), it can be advantageous for a remote vehicle assistance (RVA) operator to understand the cause of the immobility so that the RVA operator can perform the appropriate intervention. Embodiments are disclosed that relate to a program flow that monitors various stop-related occurrences (hereinafter also referred to as stop constraints) as they occur based on metadata related to those stop constraints. If a duration of a stop constraint lasts beyond a pre-defined threshold, then data related to the stop constraint is provided to an RVA operator to intervene.

In an embodiment, a method comprises: determining, with at least one processor, a trajectory for a vehicle based on a location of the vehicle and sensor data associated with at least one sensor; determining, with the at least one processor, whether the trajectory is associated with at least one defined functional requirement; an in accordance with determining that the trajectory is associated with at least one defined functional requirement: determining, with the at least one processor, a first level of risk of non-compliance of the vehicle based on the at least one defined functional requirement and performance of the trajectory; determining, with the at least one processor, a region of interest based on the location of the vehicle and the trajectory; generating, with the at least one processor, a minimum perception zone based on the trajectory; assessing, with the at least one processor, a second level of risk of non-compliance of the vehicle associated with performance of the trajectory by the vehicle based on the minimum perception zone; determining, with the at least one processor, a total level of risk based on a combination of the first level of risk and the second level of risk; determining, with the at least one processor, whether the total level of risk would place the vehicle in a safe state or an unsafe state; in accordance with the total level of risk placing the vehicle in a safe state, traversing the trajectory; and in accordance with the total level of risk placing the vehicle in an unsafe state, requesting an intervention to place the vehicle in a safe state.

In an embodiment, the method further comprises: requesting an intervention to place the vehicle in a safe state based on determining that the trajectory is not associated with at least one defined functional requirement.

In an embodiment, the first level of risk is based on a perception visibility model for the region of interest that indicates a probability that an object detection in the sensor data is visible to at least one sensor of the vehicle in the region of interest, and wherein assessing the first level of risk comprises: assessing the first level of risk based on the probability that the object detection in the environment is visible to the at least one sensor of the vehicle in the region of interest.

In an embodiment, determining a first level of risk of non-compliance of the vehicle with the at least one defined functional requirement if the vehicle traverses the trajectory, further comprises: determining whether at least one quantitative metric associated with the defined functional requirements is satisfied.

In an embodiment, the at least one quantitative metric is associated with at least one regulatory rule, safety rule, or passenger comfort rule.

In an embodiment, the perception visibility model is based on at least one prior perception visibility model.

In an embodiment, the probability is determined based on sensor condition data associated with an operational state of the at least one sensor of the vehicle.

In an embodiment, the operational state indicates whether a field of view of the at least one sensor is occluded.

In an embodiment, the operational state indicates whether the at least one sensor has malfunctioned.

In an embodiment, the probability is determined based on at least one environmental condition.

In an embodiment, the at least one environmental condition is a weather condition.

In an embodiment, the at least one environmental condition is an illumination condition.

In an embodiment, the intervention is a minimum risk maneuver.

In an embodiment, the method further comprises: receiving, based on requesting the intervention, data associated with control of the vehicle, wherein the data is configured to cause the vehicle to take one or more actions.

In an embodiment, the minimum perception zone is based on the trajectory.

In an embodiment, a system comprises: at least one processor; and at least one non-transitory computer-readable media comprising instructions that, upon execution of the instructions by the at least one processor, cause the vehicle to perform any of the preceding methods.

In an embodiment, at least one non-transitory computer-readable media comprises instructions that, upon execution of the instructions by the at least one processor, cause the vehicle to perform any of the preceding methods.

Some of the advantages of the techniques described above include provision of an OED framework that efficiently addresses complexities involved in operation of an AV in an environment across various driving scenarios. In a specific example herein, the complexities relate to different driving scenarios where multiple factors (e.g., lighting, weather conditions, other objects that are in or near the road, characteristics of the road, etc.) influence the ODD of the autonomous system. The OED framework allows a minimum risk maneuver (MRM) or other maneuver or intervention is triggered based on a holistic analysis of a driving scenario.

Another advantage is that embodiments herein provide a framework to model sensor perception capability and performance under different conditions. Such conditions include environmental conditions (e.g., fog, rain, sun glare, etc.), sensor-visibility conditions (e.g., blockage of the sensor by a foreign object such as mud), occlusion-related conditions (e.g., the detection of an object by the sensor), or sensor-structural conditions (e.g., the type or placement of the sensor). By identifying this OED framework, the model of the sensor perception capability is usable by the autonomous system to ascertain operational capabilities of the autonomous system in different scenarios so that the autonomous system may be operated within those capabilities.

Another advantage is that embodiments herein provide a quantitative measure of non-compliance risk with respect to safety, regulatory and comfort rules under different well-defined driving scenarios, while still allowing for direct intervention assignment in response to ill-defined situations (e.g., anomalous events) or prolonged immobility (e.g., "stuck" detection). Multiple situations or scenarios are evaluated concurrently (e.g., lane change while navigating an intersection). Internal state agnostic metrics are generalized for both compliance check of current state and of predicted future states. Applicability of the situation assessment is independent of underlying decision making algorithm(s). The situation assessment can be used to assess multiple concurrent trajectory proposals.

Another advantage is that embodiments herein provide a lightweight data format that conveys sufficient situational context while concurrently conveying concise internal state data of the autonomous system to an RVA operator. As such, the RVA operator is enabled to provide appropriate intervention without having incomplete knowledge of the reason that the vehicle is immobile. For example, by virtue of the implementation of techniques described herein, more accurate and relevant data about the state of the autonomous system is provided to the RVA operator, reducing the amount of time needed by the RVA operator to analyze the data provided and implement an appropriate intervention.

Overview of Systems and Architectures

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote AV system 114, fleet management system 116, and V2I system 118. Vehicles 102a-102n, vehicle-to-infrastructure (V2I) device 110, network 112, remote AV system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, remote AV system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which a vehicle can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the vehicle and the second state or region includes a location or locations at which the individual or individuals picked-up by the vehicle are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a vehicle-to-infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
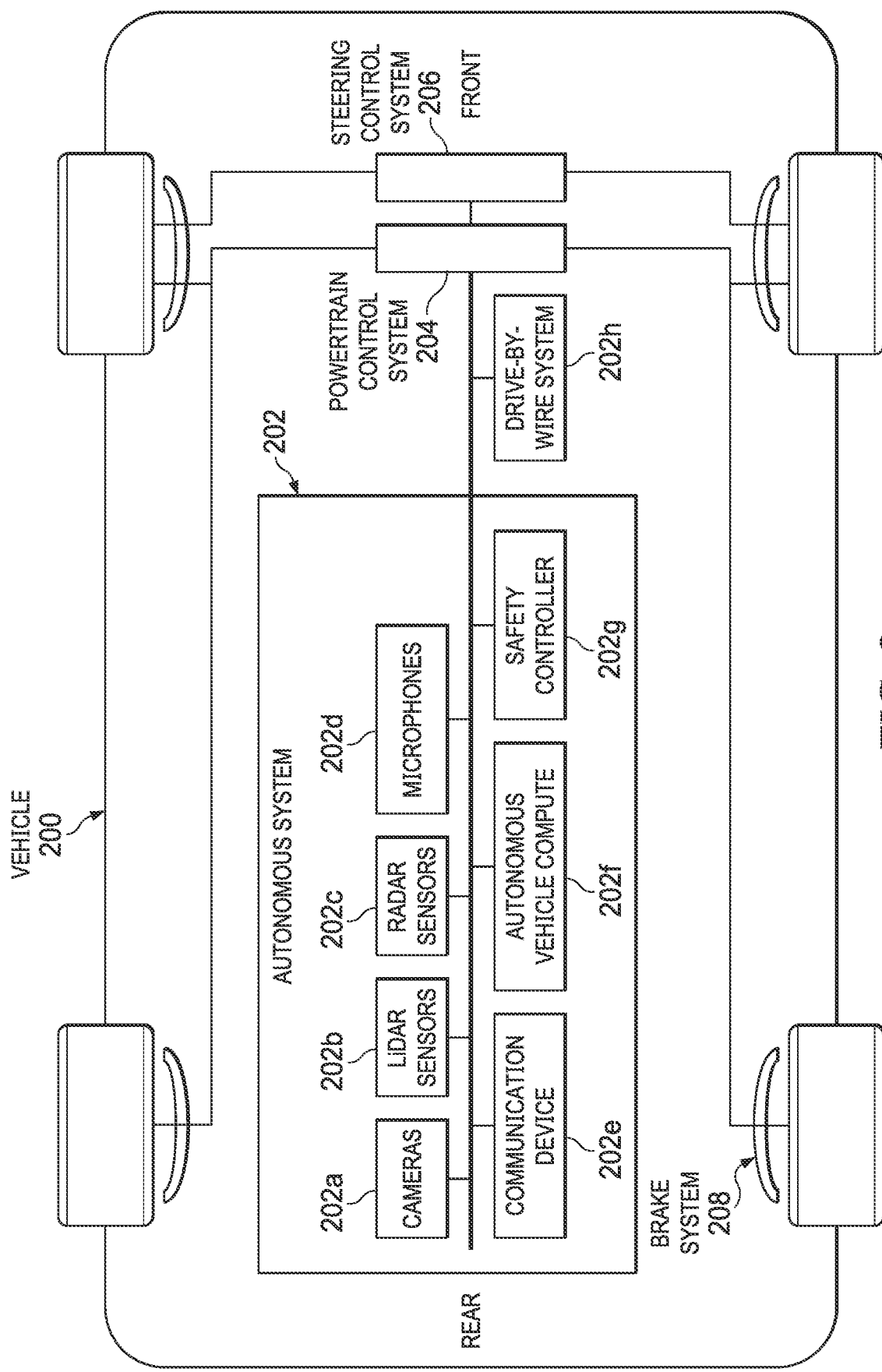
FIG. 2 is a diagram of one or more systems of a vehicle including an autonomous system, in accordance with various embodiments.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, global positioning system (GPS) receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
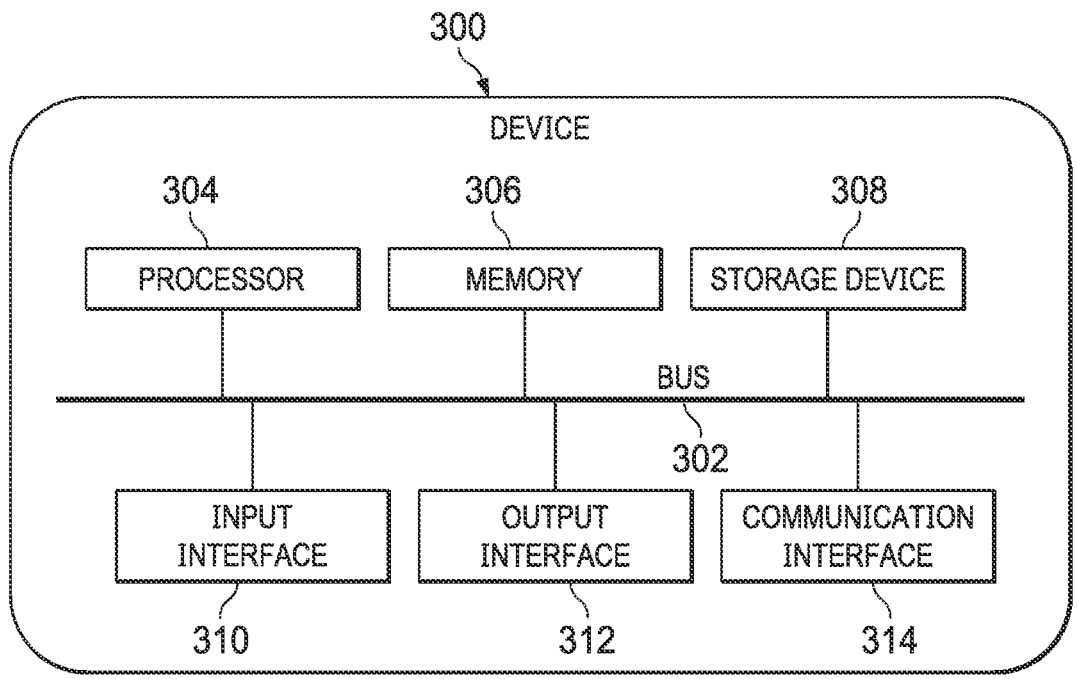
FIG. 3 is a diagram of components of one or more devices and/or one or more systems of FIGS. 1 and 2, in accordance with various embodiments.

Cameras 202a include at least one device configured to be in communication with communication device 202e, AV compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to AV compute 202f and/or a fleet management system (e.g., a fleet management system that is the same as or similar to fleet management system 116 of FIG. 1). In such an example, AV compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation data. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, AV compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, AV compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum. In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, AV compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, AV compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

AV compute 202f include at least one device configured to be in communication with cameras 202a, LiDAR sensors 202b, radar sensors 202c, microphones 202d, communication device 202e, safety controller 202g, and/or DBW system 202h. In some examples, AV compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, AV compute 202f is the same as or similar to autonomous vehicle compute 400, described herein. Additionally, or alternatively, in some embodiments AV compute 202f is configured to be in communication with a remote AV system (e.g., a remote AV system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, AV computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by AV compute 202f.

DBW system 202h includes at least one device configured to be in communication with communication device 202e and/or AV compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a GPS receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), remote AV system 114, fleet management system 116, vehicle-to-infrastructure system 118, autonomous system 202, brake system 208, DBW system 202h, steering control system 206, powertrain control system 204, and/or one or more devices of network 112 (e.g., one or more devices of a system of network 112). In some embodiments, one or more devices of vehicles 102 (e.g., one or more devices of a system of vehicles 102), remote AV system 114, fleet management system 116, vehicle-to-infrastructure system 118, autonomous system 202, brake system 208, DBW system 202h, steering control system 206, powertrain control system 204, and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application-specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer-readable medium, along with a corresponding drive.

Input interface 310 includes a component that permits device 300 to receive data, such as via user input (e.g., a touchscreen display, a keyboard, a keypad, a mouse, a button, a switch, a microphone, a camera, and/or the like). Additionally or alternatively, in some embodiments input interface 310 includes a sensor that senses data (e.g., a GPS receiver, an accelerometer, a gyroscope, an actuator, and/or the like). Output interface 312 includes a component that provides output data from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive data from another device and/or provide data to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer-readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving data from, storing data in, communicating data to, or searching data stored in the data storage or the at least one data structure in memory 306 or storage component 308. In some examples, the data includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
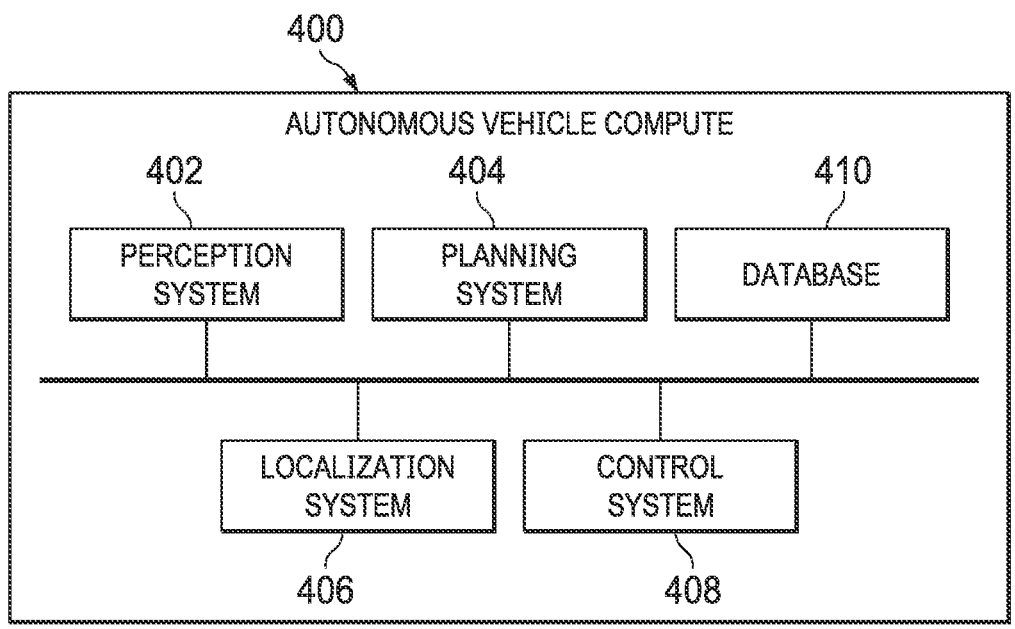
FIG. 4 is a diagram of certain components of an autonomous system, in accordance with various embodiments.

Referring now to FIG. 4, illustrated is an example block diagram of an autonomous vehicle compute 400 (sometimes referred to as an "AV stack"). As illustrated, AV compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., AV compute 202f of vehicle 200). Additionally, or alternatively, in some embodiments, perception system 402, planning system 404, localization system 406, control system 408, and database 410 are included in one or more standalone systems (e.g., one or more systems that are the same as or similar to AV compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in AV compute 400 are implemented in software (e.g., in software instructions stored in memory), computer hardware (e.g., by microprocessors, microcontrollers, application-specific integrated circuits [ASICs], FPGAs, and/or the like), or combinations of computer software and computer hardware. It will also be understood that, in some embodiments, AV compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a GPS receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one auto encoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406, and/or control system 408. In some examples, database 410 includes a storage component (e.g., a storage component that is the same as or similar to storage component 308 of FIG. 3) that stores data and/or software related to the operation and uses at least one system of AV compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like. In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), a remote AV system (e.g., a remote AV system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Operational Envelope Detection with Situation Assessment Framework

As used herein, the term "operational envelope" refers to the envelope in which an AV is operating within its capabilities. Generally, the AV is operating within its designed operational envelope when its current capabilities (e.g., perception, planning, prediction, control, communication, etc.) meet or exceed the functional requirements imposed by the maneuver that the vehicle is performing or is expected to perform under a given situation with identified functional restrictions (e.g., environmental conditions, road structures, behavior of other road users, etc.).

Figure 5:
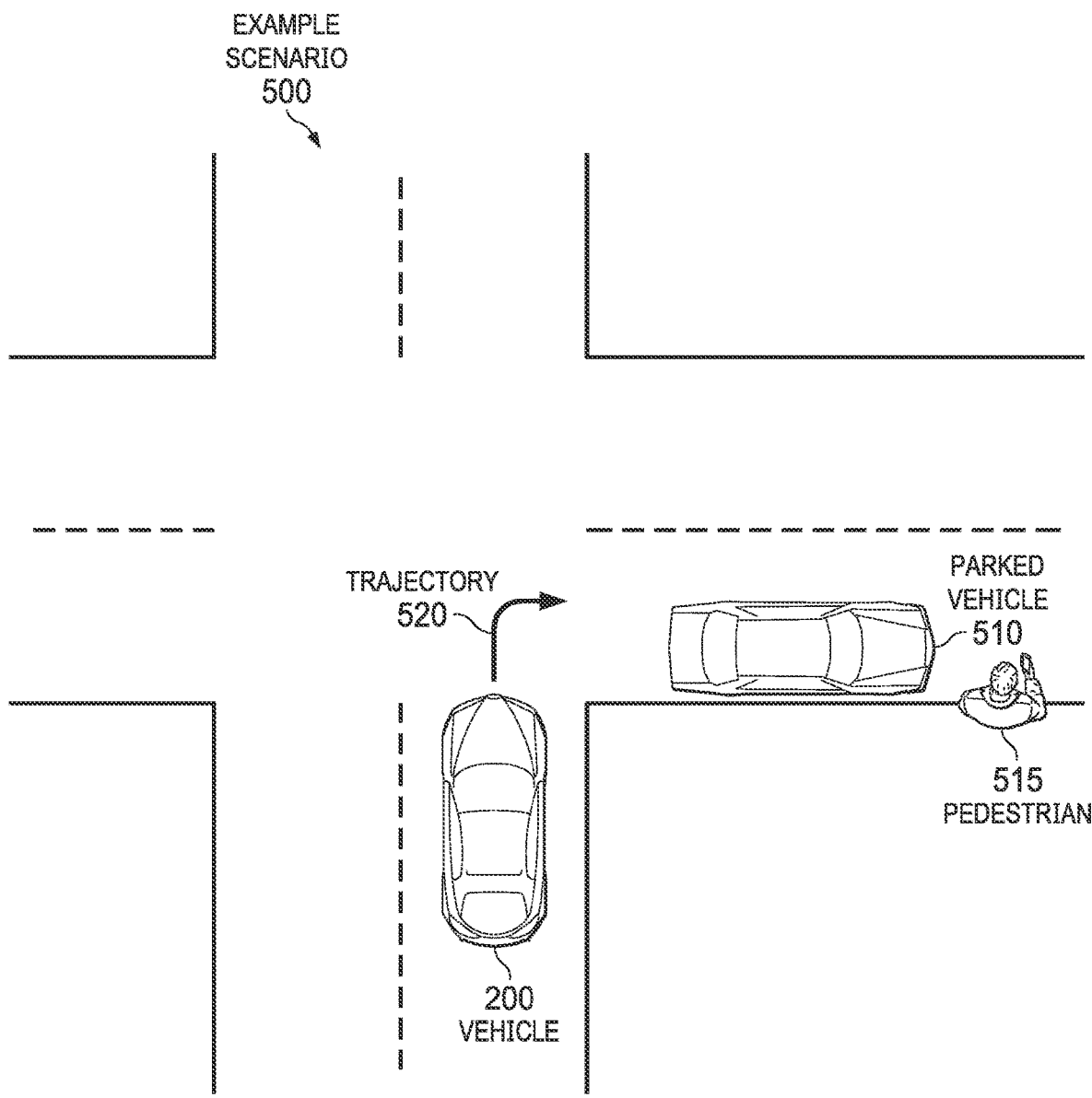
FIG. 5 illustrates an example scenario which a vehicle may encounter, in accordance with various embodiments.

FIG. 5 depicts an example scenario 500 which a vehicle 200 with an autonomous system 202 may encounter. Specifically, FIG. 5 depicts AV 200 intending to make a right turn at an intersection. The right turn is depicted showing an intended trajectory 520 of AV 200. As described above, the term "trajectory" refers to a path that AV 200 follows through an environment as a function of time. Specifically, as used herein, AV 200 will be said to "traverse the trajectory" as AV 200 performs the sequence of actions. In another embodiment, such actions are referred to as "perform[ing] a maneuver."

In this example scenario 500, a number of objects such as a parked vehicle 510 and a pedestrian 515 are present. Specifically, the parked vehicle 510 is depicted as being parked along a curb in the lane in which the AV 200 intends to turn. The pedestrian 515 is at least partially in the lane as well. In this embodiment, as the AV 200 maneuvers through the right turn along the trajectory 520, the parked vehicle 510 can block the visibility of AV 200 such that AV 200 is unable to see the pedestrian. Therefore, in this embodiment, the operational envelope of AV 200 is affected by the positioning of the parked vehicle 510 such that the capabilities of AV 200 (e.g., the perception of AV 200) influence (in this case, constrain) the ability of AV 200 to navigate the trajectory 520.

Embodiments herein relate to an autonomous system that measures functional capabilities and requirements of AV 200 to assist with ensuring the operation of AV 200 within its ODD based on accurate assessment of the environment in which AV 200 is located and/or the situation the AV 200 is involved in.

Figure 6:
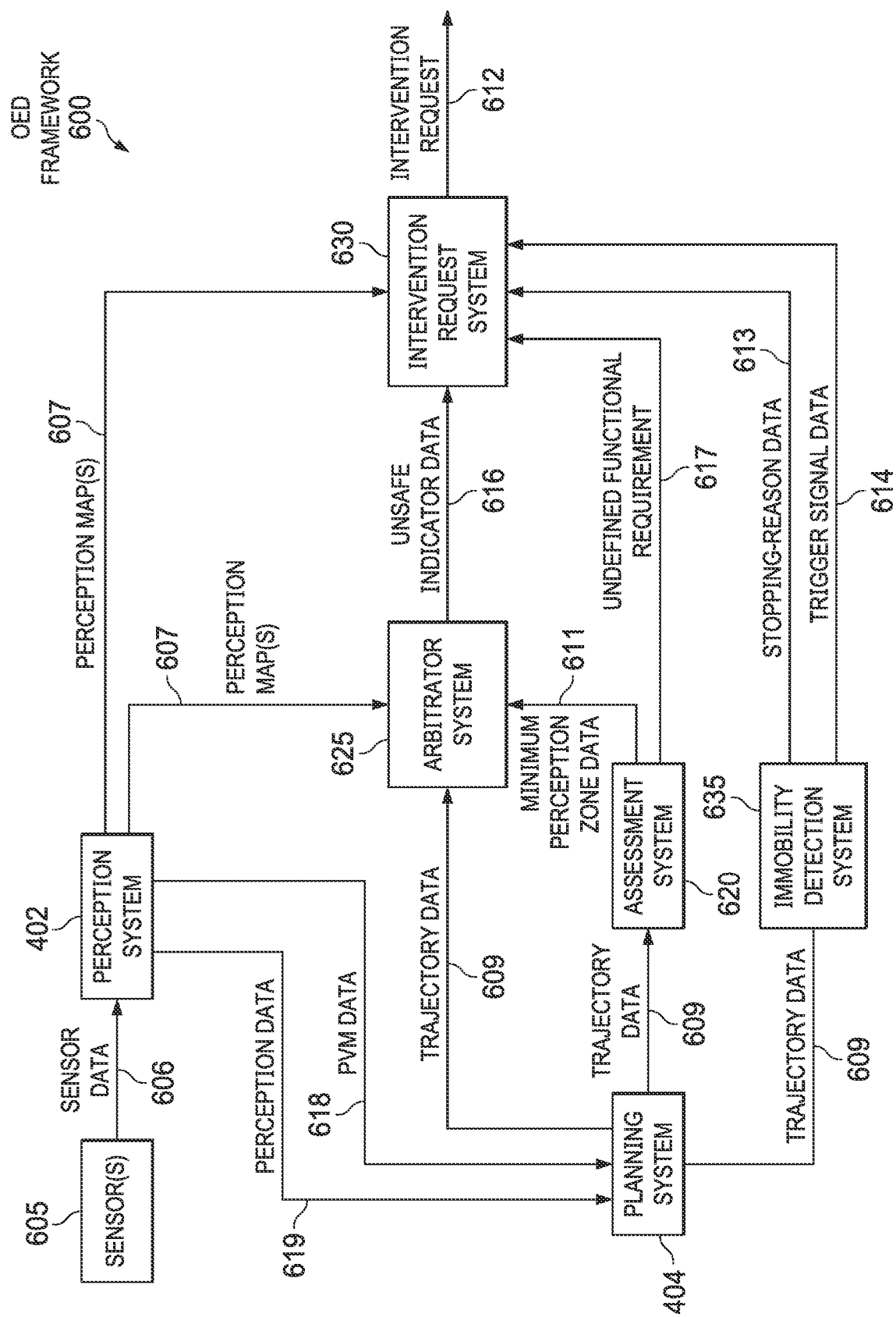
FIG. 6 illustrates an example operational envelope detection (OED) framework, in accordance with various embodiments.

Referring to FIG. 6, FIG. 6 is an example OED framework. In some embodiments, one or more of the elements described with respect to OED framework 600 are performed (e.g., completely, partially, and/or the like) by one or more vehicles 102 (e.g., one or more devices of vehicles 102). Additionally, or alternatively, one or more elements described with respect to OED framework 600 can be performed (e.g., completely, partially, and/or the like) by another device or group of devices separate from, or including, vehicles 102 such as one or more of the other devices of any of FIGS. 1, 2, 3, and 4.

In some embodiments, OED framework 600 includes at least one sensor 605, which includes at least one of cameras 202a, LiDAR sensors 202b, radar sensors 202c, microphones 202d, etc. Sensors 605 are configured to output sensor data 606 to perception system 402. Sensor data 606 includes, for example, radar data, camera data, LiDAR data, etc.

In addition to the functions described above with respect to FIG. 4, perception system 402 provides at least one perception map 607. Perception map 607 describes how well (e.g., to what degree), and how far, sensors 605 of the AV can accurately perceive an object at a certain distance from AV 200 at a given time. Perception system 402 is described in greater detail below. In some embodiments, the perception system 402 is referred to as an "environmental limitation and sensor anomaly ("ELSA")" system 402.

OED framework 600 further includes planning system 404. Planning system 404 receives data from various systems and subsystems as described with respect to, for example, FIG. 4. Additionally, planning system 404 receives perception data 619 (e.g., object detections) and/or PVM data 618 from perception system 402, which planning system 404 uses to generate or update trajectory data 609 for the autonomous vehicle compute 400 to evaluate and/or for vehicles 102 to traverse. The trajectory data 609 includes one or more parameters of a trajectory such as trajectory 520. In an embodiment, PVM data 618 is generated by perception system 402, as discussed in detail below.

OED framework 600 further includes an assessment system 620. In some embodiments, assessment system 620 can be included in AV compute 400 as an independent system or included in perception system 402. In some embodiments, assessment system 620 is referred to as a "SAM" system 620. Assessment system 620 is configured to provide a perception polygon (along a top or birds-eye view of the environment in which the AV is operating) that indicates a minimum required perception zone in a region of interest. As used herein, a "perception zone" is a portion of the operating environment that is within the detection capabilities of the sensors 605 and a "region of interest" refers to a region that is within a vicinity of the AV, and more specifically is the region of the environment in which the AV is present or will move to based on trajectory data 609. Specifically, assessment system 620 identifies and outputs, based on trajectory data 609 provided by planning system 404, the minimum perception zone data 611. Minimum perception zone data 611 relates to the minimum perception zone that is required to execute the trajectory described by trajectory data 609.

An inability by the assessment system 620 to identify a minimum required perception zone can indicate that the proposed trajectory is not associated with a functional requirement. In this situation, assessment system 620 provide an indication of an undefined functional requirement 617 to the intervention request system 630. The assessment system 620 is described in greater detail below.

OED framework 600 further includes arbitrator system 625. Arbitrator system 625 is configured to receive perception map(s) 607 and the minimum perception zone data 611. In an embodiment, arbitrator system 625 is further configured to receive trajectory data 609 directly from planning system 404. Arbitrator system 625 then compares perception map(s) 607 and minimum perception zone data 611 (and, in an embodiment, trajectory data 609) to identify whether the AV is operating within its ODD. Specifically, arbitrator system 625 is configured to assign a first level of risk to an output of perception system 402. In some embodiments, arbitrator system 625 is configured to assign a first level of risk of non-compliance with a functional requirement related to the trajectory based on sensor data 606.

Arbitrator system 625 further assigns a second level of risk of non-compliance with the functional requirement to the output (e.g., minimum perception zone data 611) of assessment system 620. Arbitrator system 625 calculates a total level of risk based on the assigned first and second levels of risk. Based on the total level of risk, arbitrator system 625 identifies whether the AV is in a safe state. An example of a safe state is when the AV is able to perform the assigned trajectory/maneuver or navigate the assigned trajectory/maneuver within the ODD of the AV. An example of an unsafe state is when the requirements of the trajectory/maneuver exceed the functional capabilities of the AV. If arbitrator system 625 identifies that the AV is in an unsafe state, it outputs unsafe indicator data 616 to an intervention request system 630, which generates and sends/transmits an intervention request to, e.g., remote AV system 114 for RVA intervention or to planning system 404 and/or AV control system 408 for an MRM intervention.

OED framework 600 further includes immobility detection system 635. Immobility detection system 635 is configured to identify, based on a trajectory received from planning system 404, that the AV is immobile. Immobility detection system 635 is further configured to identify a reason for that immobility and output trigger signal data 614 and stopping-reason data 613 to intervention request system 630, as described in greater detail, below.

OED framework 600 further includes intervention request system 630. Intervention request system 630 is configured to generate an intervention request 612. Intervention request 612 can be based on at least one of a perception map 607, unsafe indicator data 616, minimum perception zone data 611, stopping-reason data 613, trigger signal data 614, and/or an indication of an undefined functional requirement 617.

In one embodiment, intervention request 612 is, for example, a request to an RVA operator or teleoperator for data associated with control of the vehicle. For example, intervention request 612 can include a request for data upon which control system 408 can act to cause the AV to take one or more actions. In another embodiment, intervention request 612 is a MRM which can be a pre-identified maneuver such as the AV slowing, stopping, pulling over, etc., to place the AV back into a safe state. In another embodiment, intervention request 612 can include a request for a degraded mode operation (DMO) task such as reduced speed operation.

In an embodiment where the intervention request 612 is based on at least one perception map 607, the perception system 610 and/or the intervention request system 630 detect an error with respect to the functioning of a sensor or an emergency situation. In this embodiment, the perception system 610 can directly notify the intervention request system 630 that such an emergency situation exists, or provide at least one perception map 607, such that intervention request system 630 can generate an intervention request 612.

In one embodiment, as shown and as described in further detail below with respect to FIG. 13, the intervention request system 630 is configured to receive data such as stopping-reason data 613 and trigger signal data 614 directly from immobility detection system 635. Specifically, when immobility detection system 635 identifies that the AV is "stuck" (e.g., immobile), immobility detection system 635 provides context data (e.g., data 613, 614) related to the immobility of the AV to intervention request system 630.

Figure 7:
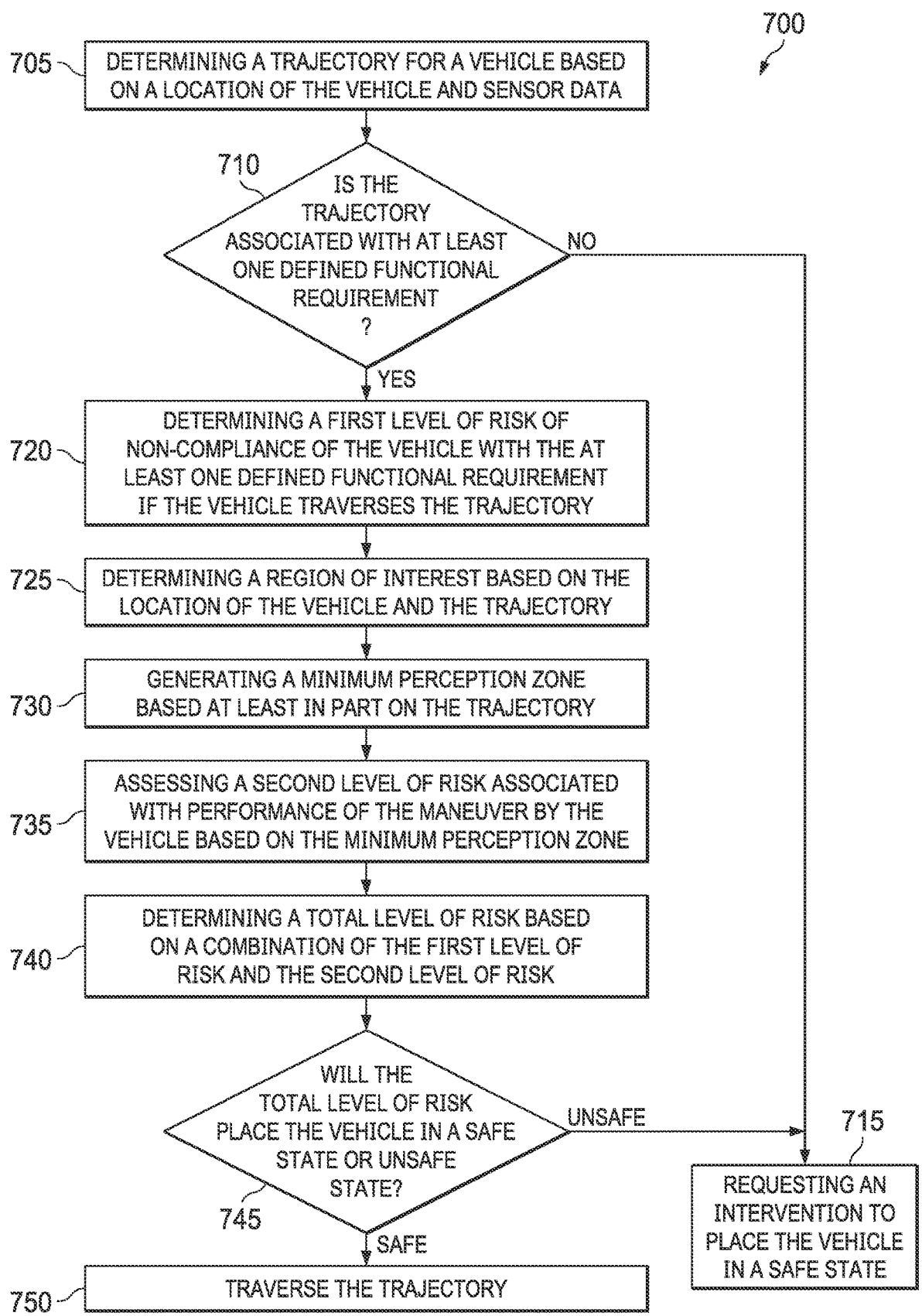
FIG. 7 illustrates an example process flow related to OED with situational assessment, in accordance with various embodiments.

FIG. 7 depicts an example process flow related to operational envelope detection with situational assessment, in accordance with various embodiments. In some embodiments, one or more of the elements described with respect to process 700 are performed (e.g., completely, partially, and/or the like) by the example OED framework 600 (e.g., a device or a group of devices included in OED framework 600). Additionally, or alternatively, in some embodiments one or more elements described with respect to process 700 are performed (e.g., completely, partially, and/or the like) by another device or group of devices separate from the example OED framework 600 such as one or more of the devices of any of FIGS. 1, 2, 3, and 4.

The process 700 includes determining, at 705, a trajectory for an AV based on a location of the AV and sensor data such as sensor data 606. The trajectory is generated at or by, for example, planning system 404 as described above. The trajectory includes at least one command that is to be implemented by control system 408 to cause the AV to take an action, such as turning, acceleration, maintaining a speed, braking, etc. Additionally, 705 may be based on localization data 801 as described in greater detail below.

The process 700 further includes determining, at 710, whether the trajectory is associated with at least one defined functional requirement. A functional requirement is a rule or constraint that the AV must comply with when traversing a given trajectory. The requirements include but are not limited to: 1) basic control of the vehicle, such as stopping, maintaining vehicle speed and turning; 2) basic need to perceive environments, such as detect traffic lights, pedestrians, bicycles, other vehicles and any other stationary or dynamic objects; 3) the need to determine the position of the vehicle (i.e., localize) in a map or lane; and 4) the capability of the vehicle to negotiate an intersection, U-turn, lane-change, merging, unprotected turn, roundabout and any other maneuver. In one embodiment, the determination is made by the assessment system 620, while in other embodiments the determination is additionally or alternatively made by arbitrator system 625 or some other system or subsystem of the vehicle.

If it is determined that the trajectory is not associated with the at least one defined functional requirement, at 710, (e.g., based on an indication of an undefined functional requirement 617), then the process 700 proceeds directly to requesting, at 715, an intervention to place the vehicle in a safe state. The intervention request is performed by the intervention request system 630 as described above. Such an intervention can include one or more of the request for RVA, a MRM, a DMO task or some other intervention. Such an intervention can be desirable in this situation because an indication that the maneuver is not associated with the functional requirement indicates that the maneuver is an anomalous maneuver. The anomalous maneuver can be, for example, a crash, an emergency maneuver (e.g., a swerve or emergency stop) or some other type of maneuver.

However, if it is determined, at 710, that the trajectory is associated with at least one defined functional requirement, then the process 700 includes determining, at 720, a first level of risk of non-compliance of the vehicle with the at least one defined functional requirement if the vehicle traverses the trajectory. In an embodiment, the first level of risk is determined, at 720, by one or both of the perception system 402 and arbitrator system 625. For example, in one embodiment perception system 402 identifies the first level of risk and provides an indication of the first level of risk to arbitrator system 625. In another embodiment, the first level of risk is determined by arbitrator system 625 based on the perception map(s) 607 provided by perception system 402.

The determination of a first level of risk of non-compliance is made based on, for example, whether the functional requirements of the maneuver exceed the functional capabilities of the vehicle and, more specifically, sensor(s) 605. Specifically, the determination is made based on a PVM. In one embodiment, the generation of the PVM is based on at least one prior PVM. The PVM is described in greater detail below.

In an embodiment the determination of the first level of risk is based on a determination of whether at least one quantitative metric associated with the defined functional requirement is satisfied. Such a quantitative metric can be based on at least one rulebook, which is a data structure that includes but is not limited to regulatory rules, safety rules, passenger comfort rules, or some other type of rule.

The process 700 further includes determining, at 725, a region of interest based on the location of the vehicle (e.g., as provided by localization system 406) and the trajectory data (as provided by planning system 404). Such a determination is made, for example, by one or both of arbitrator system 625 and planning system 404.

The process 700 further includes generating, at 730, a minimum required perception zone for the region of interest based at least in part on the sensor data. In an embodiment, such generation is performed by the assessment system 620. The minimum required perception zone can be based on a minimum amount of perception data (e.g., a minimum amount of data associated with the environment) required for the vehicle to safely traverse the trajectory. In an embodiment, the minimum amount of perception data is based on an analysis of the trajectory (e.g., the minimum amount of perception data is dynamic), whereas in another embodiment the minimum amount of perception data is pre-identified (e.g., the minimum amount of perception data is static).

The process 700 further includes assessing, at 735, a second level of risk associated with traversal of the trajectory by the vehicle based on the minimum perception zone. In an embodiment, the assessment is performed by one or both of assessment system 620 and arbitrator system 625. For example, in one embodiment the assessment system 620 identifies the risk and provides that data to arbitrator system 625. In another embodiment, assessment system 620 provides minimum perception zone data 611 to arbitrator system 625, and arbitrator system 625 identifies the second level of risk. Similarly to the assessment of the first level of risk, the assessment of the second level of risk is based on determining whether functional requirements for operation of the AV exceed the capabilities of the AV or sensors of the AV.

The process 700 further includes determining, at 740, a total level of risk based on a combination of the first level of risk (as determined at element 720) and the second level of risk (as assessed at element 735). Such a determination is performed by arbitrator system 625 and can be based on one or more mathematical functions such as addition of the risk, a mean of the risk, an average of the risk, a median of the risk, or some other mathematical function. In another embodiment, the total risk is identified based only on the highest one of the first or second levels of risk.

The process 700 further includes determining, at element 745, whether the total level of risk will place the vehicle in a safe state or unsafe state. Such a determination is performed by arbitrator system 625. In one embodiment, the determination is based on comparison of the total level of risk to a threshold related to the identified maneuver. In other words, the threshold is dynamic. In another embodiment, the determination is based on comparison of the total level of risk to a pre-identified threshold that is independent of the maneuver. In other words, the threshold is static. If the total level of risk meets (or exceeds) the threshold, then arbitrator system 625 identifies that the AV is in, or will be in, an unsafe state and proceeds to element 715 by, for example, providing unsafe indicator data 616 to intervention request system 630. However, if the total level of risk is below (or at or below) the threshold, arbitrator system 625 identifies that the AV is in, or will be in, a safe state and traverses the trajectory (e.g., performs a maneuver) at 750. Specifically, arbitrator system 625 facilitates traversal of the trajectory by another system or subsystem of the AV such as control system 408.

Generally, the PVM for the region of interest indicates a probability that an object detection in the perception data is visible to at least one sensor of the AV in the region of interest. The probability can be based on one or more of a variety of factors such as sensor condition data associated with an operational state of the at least one sensor of the AV. As used herein, the operational state indicates whether a field of view of the at least one sensor is occluded (and, if so, the operational state can indicate to what degree the field of view is occluded), and/or whether the at least one sensor has malfunctioned. In another embodiment, the probability is determined based on at least one environmental condition such as a weather condition (e.g., whether it is raining or sunny), an illumination condition (e.g., whether daylight is available or not available), or some other condition.

Example Perception System

As previously described, in an embodiment, perception system 402 provides data on how well, and how far, the sensors (e.g., sensors 605) of the AV can perceive an object at a given time. More specifically, perception system 402 is responsible for characterizing the AV's sensing capabilities by modeling and monitoring the capability of perception system 402 to detect objects and environmental features of concern around the AV. This capability is modeled as a function of sensor conditions (e.g., blockage of the sensor, a dirty sensor, a malfunctioning sensor, etc.), environmental conditions (e.g., weather, time of day, sensor occlusions, etc.), and capabilities of sensors 605 (e.g., field of view (FOV), installation location of the sensors, etc.). In alternative embodiments, perception system 402 is responsible object detection and another system separate from perception system 402 is responsible for characterizing the AV's sensing capabilities by modeling and monitoring the capability of perception system 402 to detect objects and environmental features of concern around the AV.

In embodiments, perception system 402 generates a PVM that encapsulates the environment external to the AV and the perception sensing capabilities of perception system 402 at run time. The PVM can be generated based on online and/or offline data. In an embodiment, a set of sensor detectors is used to detect and monitor sensor conditions and environmental conditions. A sensor condition is a condition of the sensor, including but not limited to: blockage/occlusion, a dirty sensor, a malfunctioning sensor, etc. An environmental condition is a condition that includes but is not limited to: weather, time of day, other objects that are occluding the sensor (e.g., obstructing the FOV of the sensor), etc.

Figure 8:
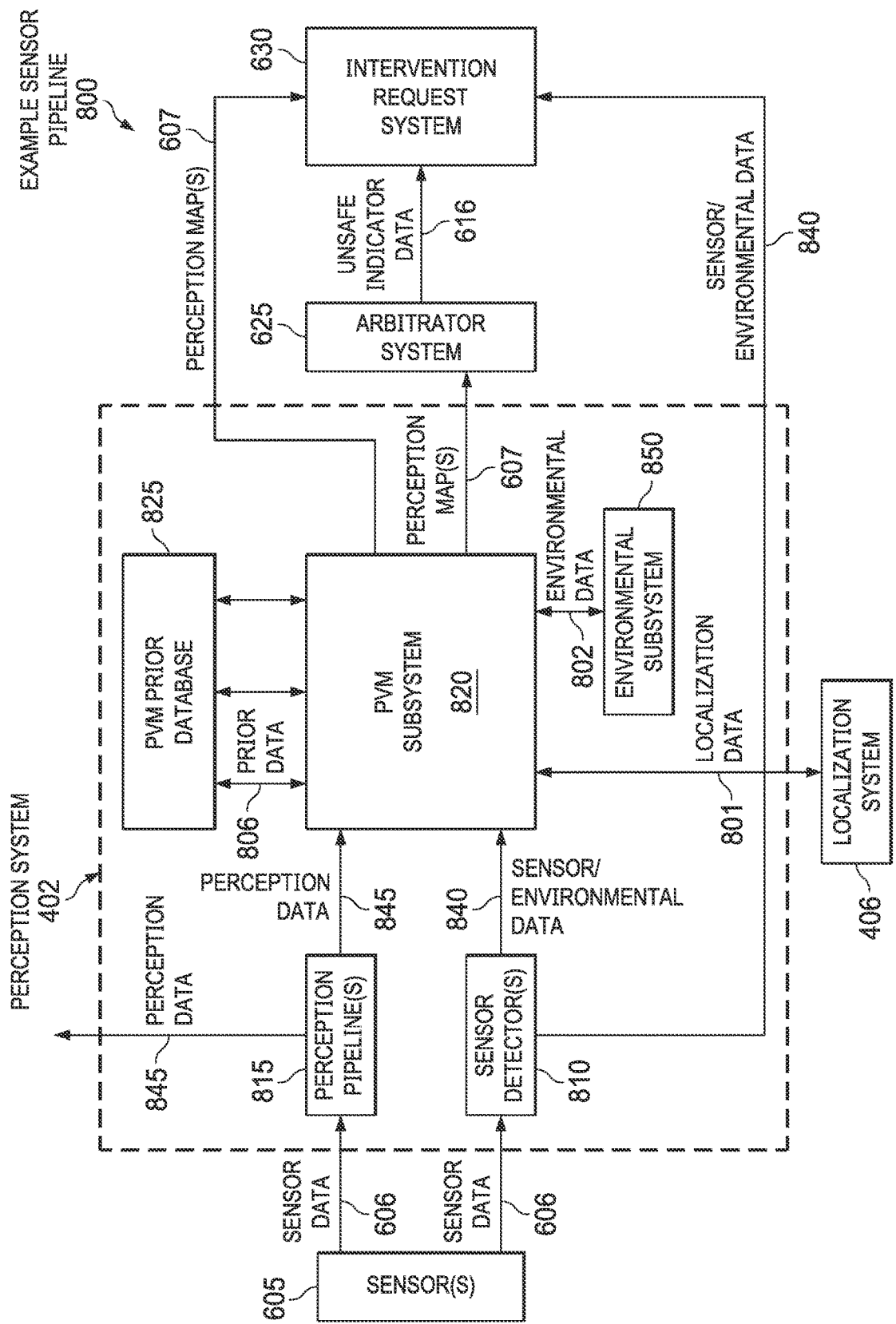
FIG. 8 is an example block diagram related to a sensor pipeline, in accordance with various embodiments.

Referring to FIG. 8, FIG. 8 depicts a block diagram of an example sensor system 800, which includes perception system 402. Perception system 402 includes at least one sensor system 810 that is configured to receive sensor data 606 from sensor(s) 605 and detect/monitor sensor conditions and/or environmental conditions. Specifically, sensor conditions such as blockage/occlusion, dirt, and malfunctions, or environmental conditions such as sun glare, can reduce the ability of perception system 402 to detect objects. Sensor system(s) 810 are configured to detect the existence and location of these conditions based on the sensor data 606 (e.g., which sensors 605 are being affected, and how, or where the issue is originating such as the location of the sun or a light that is producing a glare effect). In an embodiment, sensor detector(s) 810 are configured to identify these sensor or environmental conditions through, for example, data analysis related to sensor data 606, analysis of metadata related to the sensor data 606, control data related to the sensor(s) 605, or some other data output by the sensor(s) 605). Sensor system(s) 810 then provide data related to sensor/environmental condition 840 to PVM subsystem 820, which will be described in further detail below.

In some embodiments, as can be seen in FIG. 8, sensor/environmental data 840 is provided directly to intervention request system 630, as described above. In an embodiment, data 840 is continuously provided to intervention request system 630, while in another embodiment data 840 is only provided to the intervention request system 630 when a parameter of the data reaches or exceeds a threshold, which can be either dynamic or static. In this embodiment, intervention request system 630 is configured to act on data 840 received from sensor systems(s) 810 that indicates a situation such as sensor failure (e.g., an extreme environmental condition, a sensor malfunction, etc.), which can necessitate an intervention as described above.

Perception system 402 further includes at least one perception pipeline 815. The perception pipeline 815 is configured to receive sensor data, and perform actions related to object detection. More specifically, perception pipeline 815 is configured to generate intermediate perception results which are output as perception data 619. Such perception data 619 includes but is not limited to, a LiDAR semantic point cloud that carries data of ground and detected objects. In other embodiments, perception data 845 includes, for example, data related to RADAR detection, data related to a camera or cameras, etc. Perception data 619 is output by the perception pipeline(s) 815 to PVM subsystem 820 and planning system 404.

Perception data 619 is used by the PVM for identifying environment occlusion, as well as identifying/interpreting LiDAR data. The PVM can also use perception data 619 output by the perception pipeline 815 to construct perception map 607 such as a PoD map related to an object within the vicinity of the AV. Such a PoD map is described in further detail below. The perception pipeline 815 is further configured to perform similar functions, or generate similar data, related to RADAR data, camera data, or some other type of data generated by or related to the sensor(s) 605. It will also be understood that, although FIG. 8 only shows a single perception pipeline, in other embodiments perception system 402 includes a plurality of perception pipelines 815. In some embodiments, each sensor of the sensor(s) 605 has its own perception pipeline, while in other embodiments at least one of the sensor(s) shares a perception pipeline.

Perception system 402 further includes PVM subsystem 820. PVM subsystem 820 is configured to receive perception data 619 and sensor/environmental data 840 and generate a PVM. Generally, the PVM is a model that indicates an area of visibility of sensors 605 of the AV. As will be described in greater detail below, the PVM is used to generate at least one perception map 607, such as a PoD vicinity map for respective objects of concern (e.g., a vehicle, a pedestrian, an object adjacent to the vehicle such as a mailbox or light post, etc.). The PVM further generates perception map 607, such as an occlusion level map that models environment occlusions and severity around the AV. The PoD vicinity map and the occlusion map are depicted and discussed in greater detail below.

Generally, the PVM subsystem 820 generates the PVM based on data such as the sensor/environmental data 840 and the perception data 619. In an embodiment, the PVM is further based on additional data such as localization data 801 provided by a localization system 406. The localization data 801 includes data related to a location or environment of the AV, and can be used by PVM subsystem 820 to identify whether there are one or more objects (e.g., a building, an overpass, etc.) in the vicinity of the AV that affect the visibility of one or more sensors of the AV. Such data can be provided by, for example, a Global Navigation Satellite System (e.g., GPS).

In an embodiment, the PVM is further based on environmental data 802 that indicates an environmental condition. Such environmental data 802 includes, for example, a weather forecast as generated by a weather service to which the environmental subsystem 850 is communicatively coupled. Environmental data 802 can additionally or alternatively include data related to sensors of the AV (or to which it is communicatively coupled) such as a barometer, a humidity sensor, or some other type of sensor that indicates an environmental condition within a vicinity of the AV.

In an embodiment, the PVM subsystem 820 is configured to further base the PVM, or a resultant map thereof such as a PoD vicinity map or an occlusion map, on prior data 806 stored in a PVM prior database 825. Such prior data 806 can include a previous PVM, a previous PoD vicinity map, a previous occlusion map, and/or some other type of data.

The resultant map(s) of the PVM subsystem are output by the perception system 402 to arbitrator system 625, to determine a first level of risk as described above with respect to element 720. In some embodiments, one or more of the maps 607 can also be output directly to intervention request system 630 to determine an intervention based on the result of the map. For example, in an embodiment, the one or more of the maps generated by the PVM subsystem 820 based on the PVM are continuously provided to intervention request system 630, while in another embodiment the map(s) are only provided to intervention request system 630 when a parameter of the map(s) reaches or exceeds a threshold, which can be either dynamic or static. In this embodiment, intervention request system 630 is configured to act on the map(s) received from the PVM subsystem 820 that indicates a situation such as an extreme occlusion, an object that is very close to the AV, etc., which can necessitate an intervention as described above.

Figure 9:
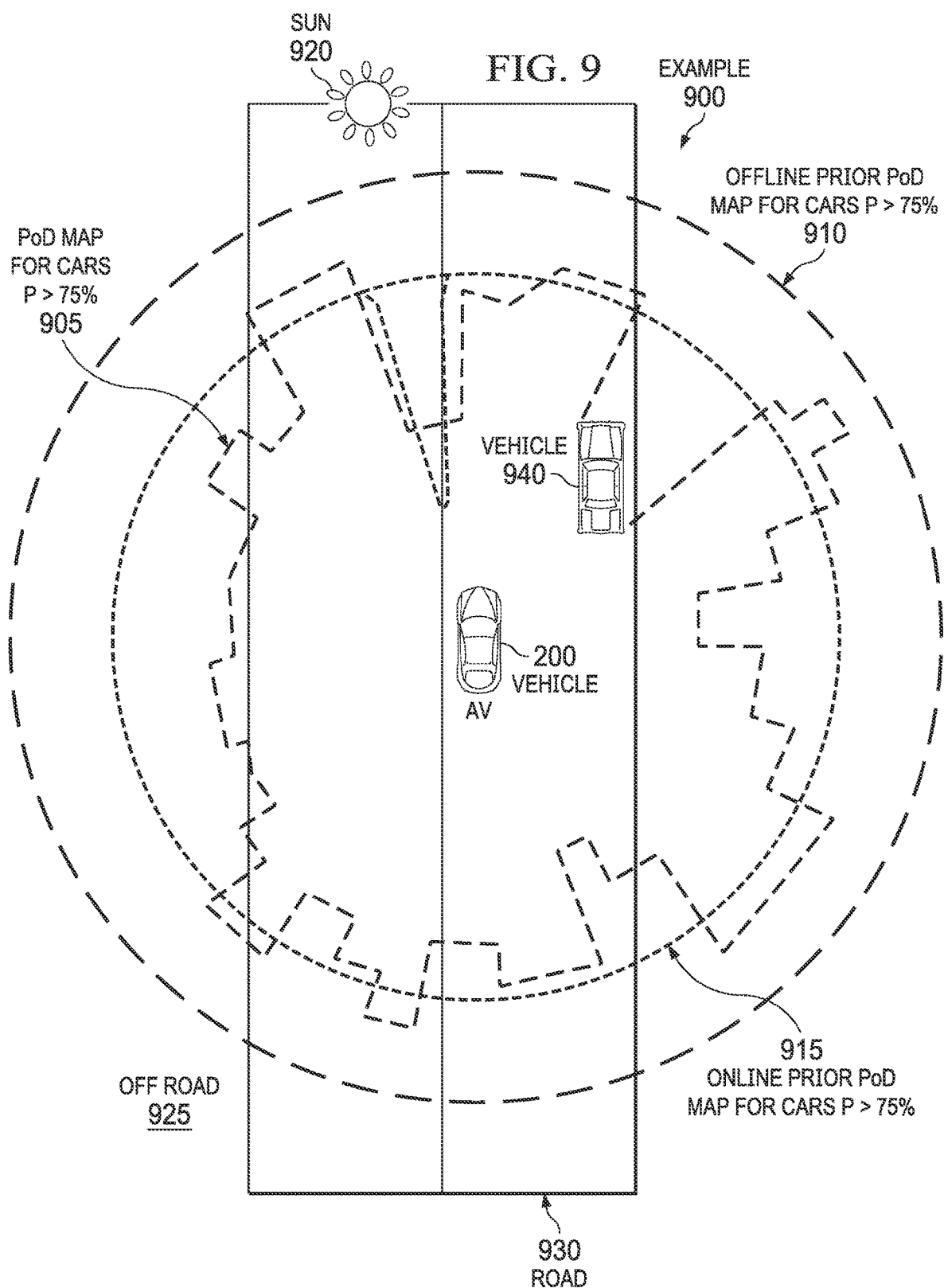
FIG. 9 illustrates an example of a probability of detection (PoD) map, in accordance with various embodiments.

Referring to FIG. 9, FIG. 9 depicts an example 900 of a PoD map. As noted previously, perception system 402, and particularly PVM subsystem 820, is configured to generate at least one PoD map for different objects (e.g., one PoD map for vehicles, another for pedestrians, etc.). Additionally, as noted, the PoD maps can be based on one or more previous PoD maps that are supplied from the PVM prior database 825.

The example 900 depicts a PoD map for vehicles. Specifically, vehicle 200 (e.g., an AV) is located on a road 930, which can be a street, a lane, a highway, a boulevard, etc. For the sake of this example 900, the environment adjacent to road 930 is further labeled as "off road" 925. Vehicle 940 (e.g., another vehicle) is located in the vicinity of vehicle 200. Additionally, the location of sun 920 is depicted for the sake of this example 900 to be in front of vehicle 200.

In this embodiment, PoD map 905 is a PoD map related to agents (e.g., vehicles, pedestrians, bicyclists, motorcycles, etc.), such as vehicle 940. Specifically, PoD map 905 represents a distance threshold at which there is a about N % (N=75%) chance or greater that vehicle 200 will be detected by a sensor of vehicle 200, such as sensor(s) 605. In some embodiments, PoD map 905 can be affected by or based on an azimuth angle (i.e., an angle of an object from the horizon), whereas in other embodiments the azimuth angle is not a factor used in the calculation of PoD map 905.

As can be seen in the example of FIG. 9, PoD map 905 generally spans a vicinity surrounding the vehicle 200. However, it will be noted that PoD map 905 has three limitations depicted in FIG. 9. The first limitation is caused by the presence of the vehicle 940, which can reduce the ability of a sensor of vehicle 200 to detect a vehicle that is situated such that the vehicle 940 is between vehicle 200 and the other vehicle. Another limitation is seen at the sun 920, which reduces the range of PoD map 905 due to, for example, glare or another illumination-related environmental condition. Another limitation is seen to the left vehicle 200 where PoD map 905 generally conforms to the edge of the road 930. This limitation may be based on, for example, the presence of a barrier, a building, or some other limitation. It will be understood that this example map is intended as only one example, and the specific angles at which the PoD map 905 is adjusted, the size or shape of PoD map 905, the factors affecting PoD map 905, etc. can be different in different embodiments. Additionally, although the value used for the PoD maps in this example 900 are described as having an example threshold value of 75%, other values can be used in other embodiments. In some embodiments, the threshold value is selected based on the type of sensor, the type of object with which the PoD map is associated, or some other factor. In an embodiment, PoD value can be selected based on requirements of modules that are upstream or downstream from perception system 402.

As previously discussed, in an embodiment PVM subsystem 820 is configured to uses data related to a prior PVM, a prior PoD map, or some other data in identifying a PVM or PoD map. Such data can be stored in PVM prior database 825. The example 900 depicts two such examples of a prior PoD map. Specifically, element 915 depicts an online prior PoD map for cars with a probability of detection that is greater than, for example, 75%. As used herein, an "online" prior PoD map describes a prior PoD map related to a previous calculation by the PVM subsystem 820. Such a map can be stored in memory of PVM subsystem 820, PVM prior database 825, or both. In an embodiment, the values of online prior PoD map 915 are based on an aggregation of values from the current usage of vehicle 200 over a certain past time window (e.g., over the past 5 minutes of usage), or a certain number of samples. In this embodiment, the online prior PoD map 915 can be based on an average of those values, while in other embodiments the map 915 can be based on a mean, median, maximum, or some other function related to the prior values.

Element 910 depicts an offline prior PoD map for carts with a probability of detection that is greater than, for example, 75%. As used herein, an "offline" prior PoD map describes a PoD map that is stored in PVM prior database 825 and is intended for use in the instance that an online map (e.g., element 915) is not available, of if an environmental or sensor condition has changed significantly such that there are not a large enough number of samples to generate online map 915. Such an offline map can be considered to be a default or fallback map for use by PVM subsystem 820 in the absence of online map 915. In an embodiment, the values related to offline map 910 are related to a large number of runs, and can be further based on certain environmental conditions such as weather, location, time of day, etc. Similar to online map 915, map 910 can be based on a mean, median, maximum, or some other function related to the prior values.

In an embodiment, map 905 is initially generated based on, for example, perception data 619, sensor/environmental data 840, an offline prior PoD map 910, some other factor, and/or some combination thereof. Map 905 is then updated based on additional data such as additional perception data 619 and/or additional sensor/environmental data 840. In other words, as additional data is received, map 905 is updated. Such an update can be periodic (e.g., every x units of time), or dynamic such as only when new data is received. Map regions that are not updated (e.g., map regions for which there is no additional data in the received perception data 619 or sensor/environmental data 840) can be adjusted toward a prior value such as a value in offline prior PoD map 910 or online prior PoD map 915. Such a shift can be incremental in accordance with a pre-defined unit of measurement, or dynamic such as to a midpoint between a present value and the prior value. In an embodiment, the PoD can be updated by combining a prior probability with new information/evidence iteratively using Bayesian updating according to Equation [1]:

$$P(H|D)=P(D|H) \times P(H)/P(D), \quad [1]$$

where H is the event of detecting a certain object (e.g., a pedestrian), D is data/new information, P (D) is the probability that the observed event (e.g., rain, overall illumination) occurred (e.g., computed using the law of total probability), P (D|H) is the likelihood of the data given the event of detection, P (H) is the prior probability and P (H|D) is the new probability of detection.

Figure 10:
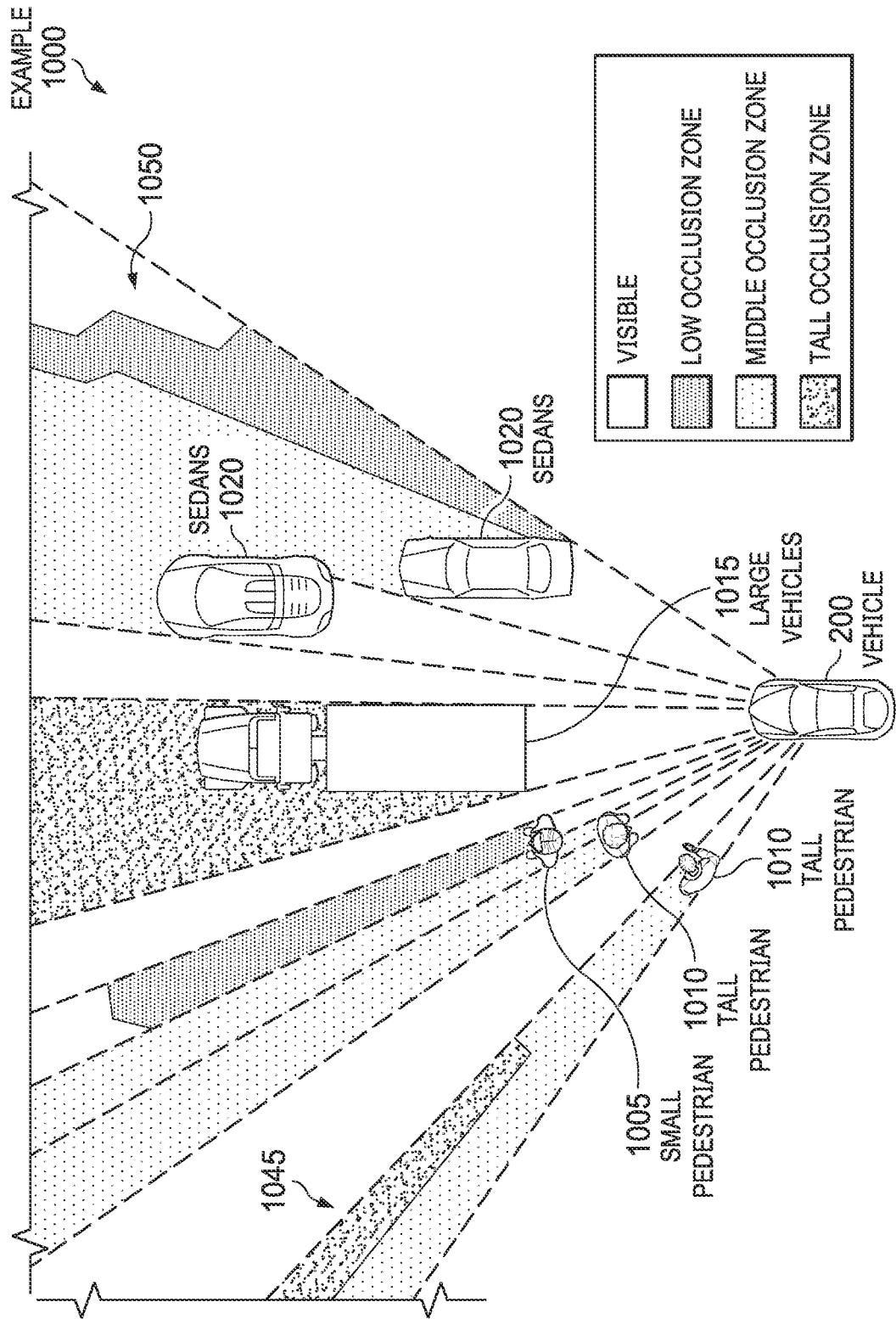
FIG. 10 illustrates an example of an occlusion map, in accordance with various embodiments.

Turning to FIG. 10, an example 1000 occlusion map is depicted. As noted above, the occlusion map is generated by PVM subsystem 820 and depicts areas that sensors 605 of vehicle 200 are occluded or blocked by an object in the vicinity of vehicle 200. The vicinity of vehicle 200 includes several objects of varying heights that form occlusion zones such as the low occlusion zone(s) 1030, the middle occlusion zone(s) 1035, and the tall occlusion zone(s) 1040. As used herein, the terms "low," "middle," and "tall" are used to distinguish relative heights with respect to one another. In one embodiment, low occlusion zone 1030 relates to a height between approximately ground level and approximately 1 meter off the ground. Middle occlusion zone 1035 relates to a height between approximately 1 meter and 2 meters off the ground. High occlusion zone 1040 relates to a height greater than approximately 2 meters. However, it will be understood that other embodiments have more or fewer occlusion zones, zones with different height parameters, etc.

The objects within the vicinity of vehicle 200 include a small pedestrian 1005 (e.g., a child), which will generate a low occlusion zone 1030. The objects further include a tall pedestrian 1010 (e.g., an adult) and one or more vehicles such as sedans 1020 which comprise middle occlusion zone 1035. The objects further include one or more large vehicles 1015 such as a moving truck, a tractor-trailer, etc. which comprises tall occlusion zone 1040.

It will be noted that in some embodiments, the occlusion zones can change over time. For example, as seen at 1045, the occlusion zone generated by a tall pedestrian 1010 changes from middle occlusion zone 1035 to tall occlusion zone 1040 as the range from vehicle 200 increases. This change can be caused by factors such as a change in the slope of the road, the type of sensor being occluded, or some other factor. Similarly, it can be seen, at 1050, the occlusion zone changes from middle occlusion zone 1035 to low occlusion zone 1030. This change can be caused by the road sloping upward, the shape of sedan 1020 (e.g., the occlusion zone caused by a cabin of sedan 1020 being different than the occlusion zone caused by the hood or rear portion of sedan 1020), the type of sensor being occluded, or some other factor.

Figure 11:
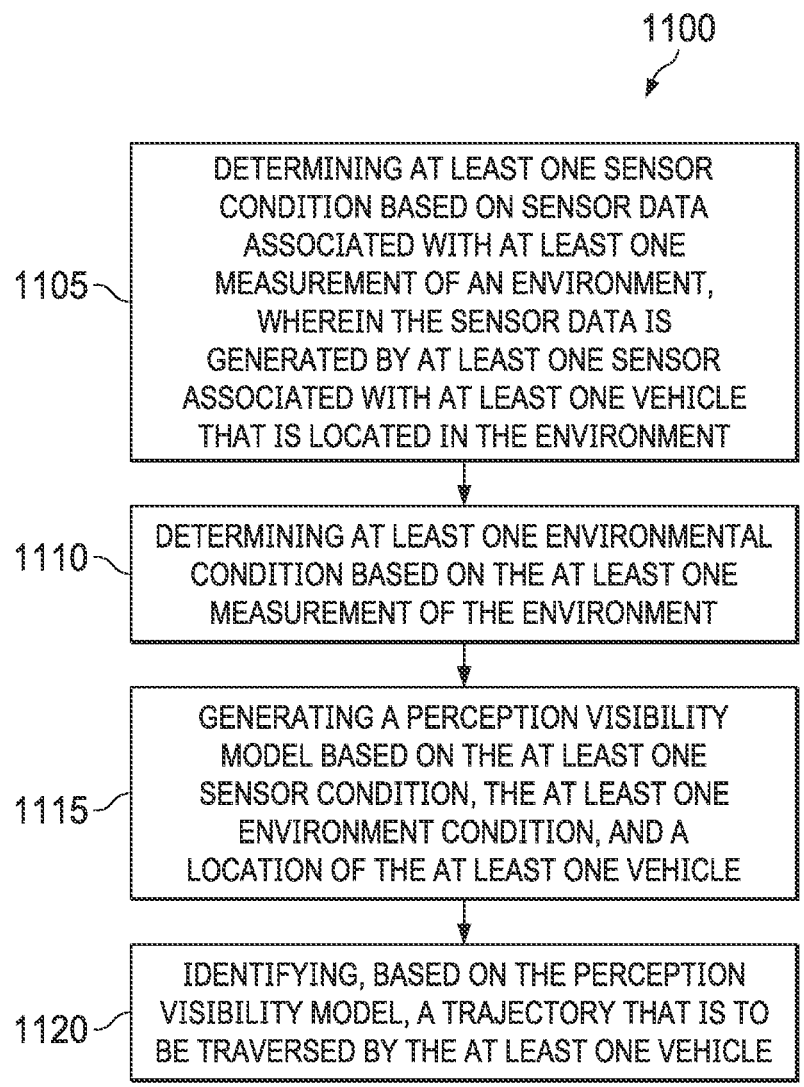
FIG. 11 illustrates an example process flow related to the perception system, in accordance with various embodiments.

Turning to FIG. 11, an example process 1100 is depicted that is related to generation and use of a PVM. In some embodiments, one or more of the elements described with respect to process 1100 are performed (e.g., completely, partially, and/or the like) by example sensor pipeline 800, and more specifically, perception system 402 and PVM subsystem 820 of FIG. 8. Additionally, or alternatively, in some embodiments one or more elements described with respect to process 1100 are performed (e.g., completely, partially, and/or the like) by another device or group of devices separate from or the example sensor pipeline 800 such as one or more of the devices of any of FIG. 1, 2, 3, 4, or 6.

In an embodiment, the process 1100 includes determining, at 1105, at least one sensor condition such as the sensor conditions described above. The sensor condition is based on sensor data 606 associated with at least one measurement of an environment, and sensor data 606 is generated by at least one of sensors 605. In an embodiment, element 1105 is performed by sensor detector(s) 810, PVM subsystem 820, or some combination thereof.

The process 1100 further includes determining, at 1110, at least one environmental condition, such as an environmental condition described above, based on the at least one measurement of the environment. The measurement can be based on, for example, environmental data 802, or sensor data 606. Similarly to element 1105, element 1110 can be performed by sensor detector(s) 810, PVM subsystem 820, or some combination thereof.

The process 1100 further includes generating, at 1115, a PVM based on the at least one sensor condition, the at least one environmental condition, and a location of the at least one vehicle. In an embodiment, element 1115 is performed by PVM subsystem 820, and the location data 801 is based on data provided by localization system 406.

The process 1100 further includes identifying, at 1120 based on the PVM, a trajectory that is to be traversed by the at least one vehicle. Element 1120 can be performed by, for example, planning system 404, or by intervention request system 630. In an embodiment, the trajectory is similar to trajectory 520, described above. In another embodiment, the trajectory relates to a maneuver such as a MRM, an RVA request, a DMO, etc., as described above.

Figure 12:
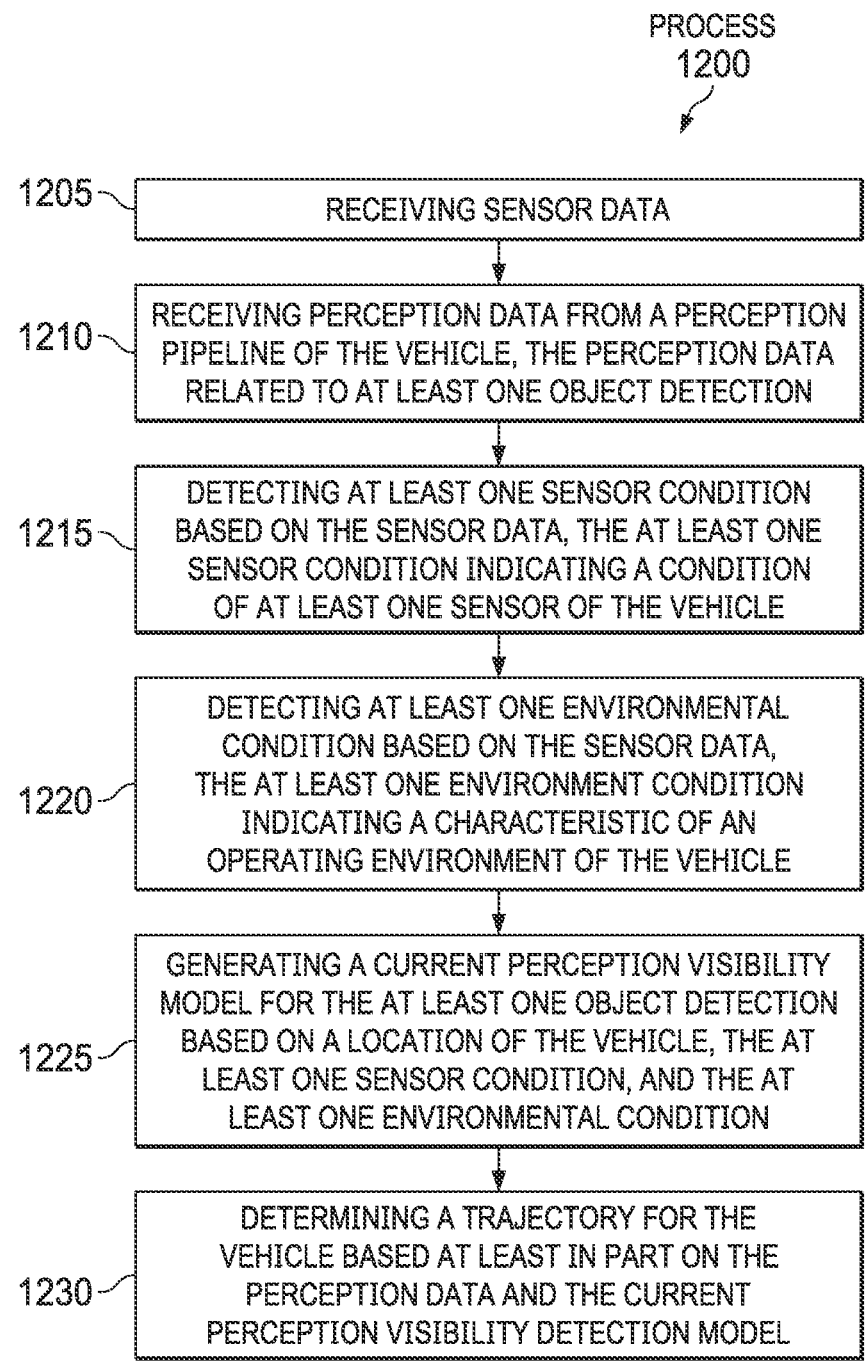
FIG. 12 illustrates an alternative example process flow related to the perception system, in accordance with various embodiments.

Turning to FIG. 12, an alternative example process 1200 is depicted that is related to generation and use of a PVM. In some embodiments, one or more of the elements described with respect to process 1200 are performed (e.g., completely, partially, and/or the like) by the example sensor pipeline 800, and more specifically, the perception system 402 and PVM subsystem 820 of FIG. 8. Additionally, or alternatively, in some embodiments one or more elements described with respect to process 1200 are performed (e.g., completely, partially, and/or the like) by another device or group of devices separate from or the example sensor pipeline 800 such as one or more of the devices of any of FIG. 1, 2, 3, 4, or 6.

The process 1200 includes receiving, at 1205, sensor data. The sensor data is, for example, the sensor data 606 received from the sensor(s) 605.

The process 1200 further includes receiving, at 1210, perception data from a perception pipeline of the vehicle. The perception data is, for example, perception data 619 received from perception pipeline(s) 815.

The process 1200 further includes detecting, at 1215, at least one sensor condition based on the sensor data. The sensor condition is detected by sensor detectors such as sensor detectors 810 and relates to a sensor condition such as malfunction, blockage, etc. as described above.

The process 1200 further includes detecting, at 1220, at least one environmental condition based on the sensor data. The environmental condition is an environmental condition as described above, and indicates a characteristic of an operating environment of the vehicle. In some embodiments, the environmental condition can be additionally or alternatively based on environmental data 802.

The process 1200 further includes generating, at 1225, a current PVM for the at least one object detection based on a location of the vehicle, the at least one sensor condition, and the at least one environmental condition. Similar to element 1115, the location data is based on data provided by localization system 406.

The process 1200 further includes determining, at 1230, a trajectory for the vehicle based at least in part on the perception data 619 and the PVM data 618. Similar to element 1230, element 1230 can be performed by, for example, planning system 404, or by intervention request system 630. In an embodiment, the trajectory is similar to trajectory 520. In another embodiment, the trajectory relates to a maneuver such as a MRM, an RVA request, a DMO, etc., as described above.

Example Situation Assessment

Figure 13:
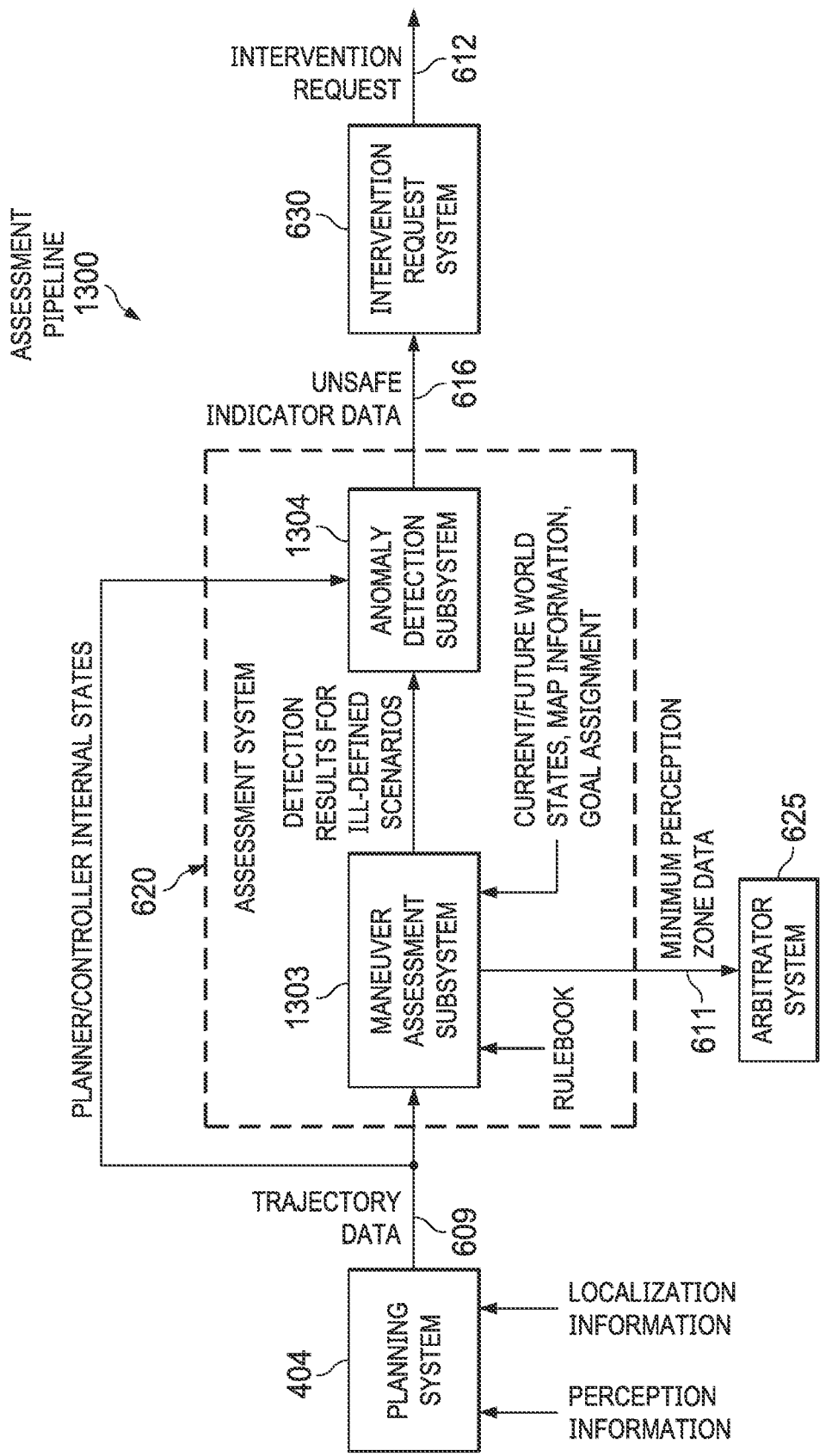
FIG. 13 is a diagram of an assessment pipeline, in accordance with various embodiments.

FIG. 13 is a diagram of an assessment pipeline 1300, according to some embodiments. The behavioral requirements of an AV at a particular moment is subjected to the maneuver that the AV is performing and the current environment of the AV. For example, when the AV is performing "a lane following a highway" driving scenario without other vulnerable road users like pedestrians or cyclists, the behavioral requirements are relatively fewer compared to when the AV is performing a "parked car circumvention" driving scenario in a busy urban environment. Assessment system 620 is tasked to understand the maneuver that the AV is performing in the current environment and to validate whether the behavioral requirements are met for the current driving scenario.

Assessment Pipeline 1300 includes planning system 404, assessment system 620, arbitrator system 625, and intervention request system 630. As shown in FIG. 13, assessment system 620 includes maneuver assessment subsystem 1303 and anomaly detection subsystem 1304. Although not explicitly shown in FIG. 13, in an embodiment planning system 404 includes, or is replaced by, control system 408.

Trajectory data 609 is generated by planning system 404 (and/or control system 408) based on perception data, map data and localization data. The trajectory data 609 is input into maneuver assessment subsystem 1303. Maneuver assessment subsystem 1303 also takes as input current and future world states for various agents (e.g., other vehicles) in the vicinity of the trajectory, map data, a goal assignment and a rulebook, and outputs detection results for ill-defined scenarios (e.g., unsafe indicator data 616) and a non-compliance risk analysis (e.g., minimum perception zone data 611). In some embodiments, updated requirements on perception system 402 are also output.

Maneuver assessment subsystem 1303 generates minimum perception zone data 611, which is output to arbitrator system 625. In an embodiment, maneuver assessment subsystem 1303 determines if the trajectory indicated by trajectory data 609 is in the ODD and its compliance with pre-defined behavioral requirements, which included but is not limited to: checks for adherence to regulatory, safety, and comfort rules. For example, triggering an RVA request or MRM during challenging situations like lane sharing with a cyclist may be avoided if the maneuver assessment subsystem 1303 can validate correct actions taken by the AV. In another embodiment, this determination is performed by arbitrator system 625 based on minimum perception zone data 611 output by the maneuver assessment subsystem 1303.

Less understood situations (e.g., without pre-defined behavioral requirements) are assessed using maneuver detection only. For example, an RVA request or MRM can be desirable when a traffic signaling officer is present at a malfunctioning traffic light intersection.

Some examples of maneuver assessment include but are not limited to gap analysis and region of interest assessments. Gap analysis checks if vehicle 200 maintains a safe gap to other road users. For example, when vehicle 200 is performing a lane change, the gap analysis checks to see if the vehicle 200 maintains a safe gap to oncoming vehicles at the front and back of the vehicle 200. Region of interest analysis is used to specify the minimum required sensor perception zone (e.g., area covered by sensors) for vehicle 200 to perform a safe maneuver.

The detection results for ill-defined scenarios are input into anomaly detection subsystem 1304 together with planner/controller internal states. Anomaly detection subsystem 1304 outputs contextual data, such as unsafe indicator data 616 for detected anomalies. An example of anomaly detection includes detecting unusual road traffic scenarios such as a traffic accident, a construction zone and other road users breaking precedence, such as a "jaywalker" or a vehicle trying to beat a red light.

Another example of anomaly detection is "stuck" detection which determines if vehicle 200 is in (or soon will enter) an unresolvable state of immobility, as described below. These situations may require remote intervention, and context on why vehicle 200 is immobile which can be used to determine an appropriate intervention task.

The contextual data is input into intervention request system 630 which selects an appropriate intervention for the detected anomaly based on the contextual data. Intervention request system 630 initiates at least one intervention, including but not limited to remote RVA requests, MRM, and DMO tasks.

Figure 14:
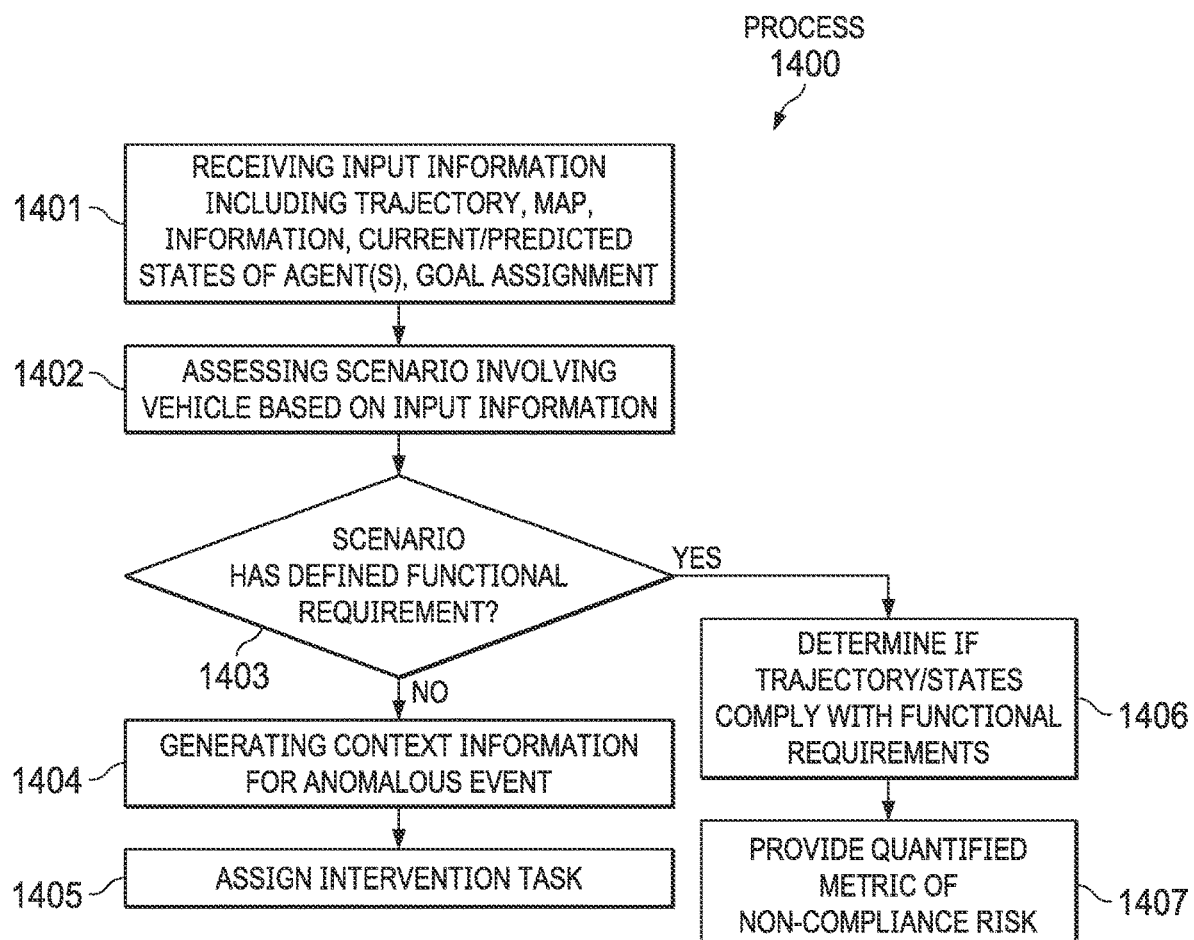
FIG. 14 is a flowchart of a process for situation assessment for an OED framework for autonomous vehicles, in accordance with various embodiments.

FIG. 14 is a flowchart of a process 1400 for situation assessment, according to some embodiments. Process 1400 can be implemented by assessment pipeline 1300 shown in FIG. 13.

Process 1400 begins by receiving input data at 1401. The input data includes a trajectory, map data, current/predicted states of agent(s) and a goal assignment for the vehicle (e.g., a destination location for the vehicle).

Process 1400 continues by assessing a driving scenario involving the vehicle based on the input data at 1402.

Process 1400 continues by determining if the scenario has a defined set of behavioral requirements at 1403.

In accordance with the scenario not having a defined set of behavioral requirements, process 1400 continues by generating context data for an anomalous event (1404) and assigning an intervention task at 1405.

In accordance with the scenario having a defined set of behavioral requirements (1403), determining if the trajectory/states comply with the defined set of behavioral requirements (1406), and providing a quantified metric of non-compliance risk (1407).

Example Immobility Detection with Situational Context

As previously noted, it is possible for an AV to become "stuck" (e.g., immobile for an extended duration) when the AV is faced with a challenging on-road situation. In this case, it is desirable to understand the context (e.g., the stopping-reason) behind the immobility such that an appropriate intervention can be requested or performed. In this embodiment, it is also desirable to identify a situation-dependent wait time before determining that the AV is stuck. As one example, the wait-times used before identifying that a vehicle is "stuck" can be different for different situations such as waiting at a red traffic light, waiting for pedestrians to cross at a crosswalk, waiting for jaywalkers to cross the road, or waiting at an intersection without a traffic signal (e.g., an all-way stop). With respect to the intersection without the traffic signal, the wait time can be different depending on the number of other vehicles that are present at the intersection. Similarly, certain reasons for immobility may be immediately identified as not being expected to resolve, and therefore the wait time before requesting an intervention can be very short. Such situations can be, for example, a traffic accident, road debris, construction, or an illegally parked vehicle that is blocking the lane.

Generally, different interventions can be used for different ones of the situations above. For example, if one or more lanes of a road are blocked, then the intervention mechanism can be or include rerouting the vehicle. If only a single lane is blocked, the intervention mechanism can be to provide a trajectory to circumvent the blockage. If the stopping-reason includes yielding to a car that does not have an identified intent to proceed, then the intervention mechanism can be to remove the stopping constraint on the AV. Similarly, if the stopping-reason includes yielding to a pedestrian on the sidewalk that does not have intent to proceed, then the intervention mechanism can include labeling the pedestrian as not having an intent to cross.

At a high level, embodiments include the following technique. It will be understood that this technique, and other techniques described with respect to the context-dependent immobility detection, can be performed by immobility detection system 635 and/or intervention request system 630. In another embodiment, the techniques described herein can be additionally or alternatively performed by at least one other processor, system, or subsystem of vehicle 200 or a system that is remote from, but communicatively coupled to, vehicle 200. First, spatial, velocity, and temporal corridor constraints are constructed with metadata in the form of constraining object identifiers (e.g., agents and map constructs). The technique then includes checking for current constraints which result in zero speed. The reason for stopping can be inferred based on the metadata related to those constraints. Specifically, the reason for stopping can be inferred without the need to consider the full amount of data outside of those constraints. Dependent on the context, the process can then include applying a timeout mechanism as a threshold for stuck detection (e.g., the vehicle can be considered to be stuck from the instant of immobility, but the immobility is only identified after the expiration of the timeout mechanism). In one embodiment, the threshold is dependent on expected "normal" waiting times for a given context. In another embodiment, the threshold is additionally or alternatively dependent on the risk expected from remaining in a current location for too long (e.g., the vehicle should not stop inside of an intersection for an extended duration due to the risk of obstructing traffic). The technique then includes reporting stuck instances, along with a duration and reason for the mobility, to an intervention request subsystem such as intervention request system 630.

Figure 15:
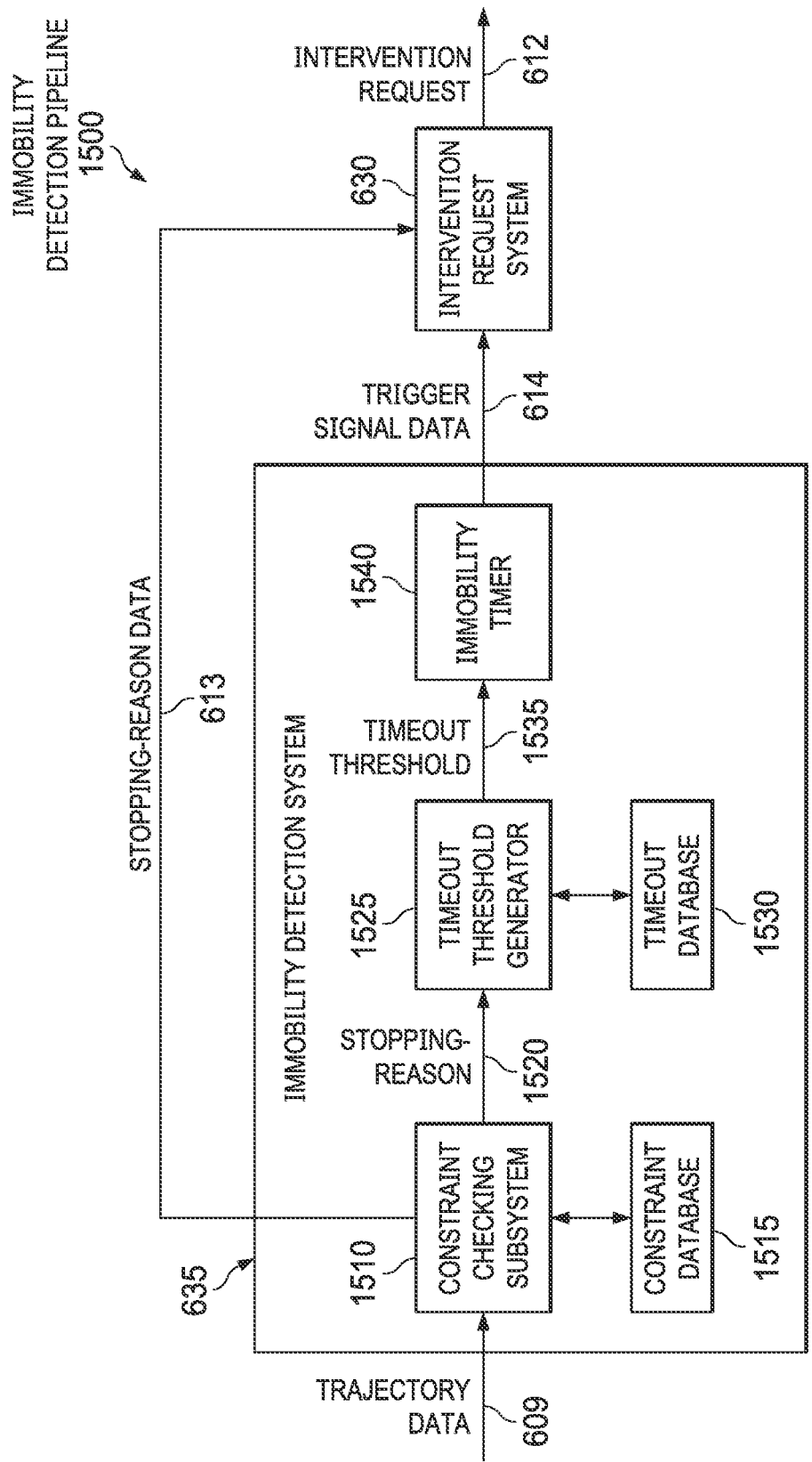
FIG. 15 is an example block diagram related to immobility detection with situational context, in accordance with various embodiments.

FIG. 15 depicts an example block diagram related to immobility detection with situational context, in accordance with various embodiments. The example 1500 includes immobility detection system 635 and intervention request system 630.

Immobility detection system 635 is configured to receive trajectory data 609, for example from planning system 404. Specifically, immobility detection system 635 includes a constraint checking subsystem 1510 that is configured to receive the data regarding trajectory 1505. Trajectory 1505 can indicate that the vehicle is to stop (e.g., become immobile).

Constraint checking subsystem 1510 is configured to identify at least one constraint related to trajectory 1505. For example, the constraints can include a spatial constraint, a velocity constraint, or a temporal corridor constraint. In some embodiments, the constraints can further include a constraint related to a first time (e.g., based on a timestamp stored in constraint database 1515) at which vehicle 200 stopped, a most recent time that vehicle 200 was stopped, a duration for which vehicle 200 has been stopped, an indication of whether vehicle 200 was already determined to be immobile, etc.

More generally, the constraints such as speed constraints can be represented by functions describing a constrained attribute (e.g., velocity (V), time (T), or lateral offset (D) which can indirectly affect a stopping decision if the lateral interval between left/right offset is too narrow for the AV) with respect to path length (S). For example, if the constraint is a linear function, then it could be described by a slope plus axis intersection point, plus a valid range [Smin, Smax].

Based on the identified constraint, constraint checking subsystem 1510 identifies stopping-reason 1520 which can be a stopping-reason as described above. Stopping-reason 1520 data can include, for example, an identifier (e.g., a label, bounding box) of an object, data related to a map location (e.g., a location of the vehicle), or some other data.

In an embodiment, stopping-reason data 613 is provided directly from the constraint checking subsystem 1510 to the intervention request system 630. Such a provision can occur, for example, if the stopping-reason is related to a situation that is not expected to resolve, as described above. In another embodiment, such a provision can occur if the stopping-reason is identified to be related to a situation for which immediate intervention is desirable (e.g., an imminent collision or some other situation).

Additionally, stopping-reason 1520 can be provided to a timeout threshold generator 1525. Timeout threshold generator 1525 is configured to determine, based on stopping-reason 1520, a timeout until an intervention is to be requested. Specifically, timeout threshold generator 1525 is communicatively coupled with a timeout database 1530 that is configured to store timeout values related to different stopping-reasons. In one embodiment, the various timeout values are pre-defined, while in another embodiment the timeout database 1530 stores data that can be used by timeout threshold generator 1525 to calculate a timeout value based on the stopping-reason (e.g., based on a queue length of cars at an all-way stop, based on a number of pedestrians in a vicinity of the vehicle, etc.). As used herein, the timeout threshold is an amount of time the vehicle will wait before initiating at least one remedial action such as a request to an RVA, a MRM, a rerouting, etc.

Timeout threshold 1535 can then be supplied to an immobility timer 1540 which can track a length of time at which the vehicle is immobile. If the immobility situation resolves, then the timeout sequence is canceled and normal action of the vehicle is resumed. However, if the immobility situation does not resolve and the time of immobility meets or exceeds the timeout threshold, immobility detection system 635 transmits trigger signal data 614 to the intervention request system 630. Intervention request system 630 is configured to perform, based on the trigger signal data 614, an intervention that includes generation and transmission of at least one intervention request 612.

The following example script describes how various speed constraints can be analyzed by constraint checking subsystem 1510 and/or constraint database 1515. It will be understood that the following script is only an example, and can differ in accordance with a different programming language, data structure, values, etc.

```
enum SPEED(or SPATIO_TEMPORAL)_CONSTRAINT_TYPE
{
PROFILE=0 (speed limit, end of path, or lateral accel limiting speed)
PROXIMITY=1 (close to something)
PEDESTRIAN=2 (proximity to humans)
GENERIC=3 (unidentified or inanimate objects)
LOGICAL=4 (intersection, crosswalk, or other road rule relating to right-of-way)
MERGING=5 (lane change)
. . . (alternate or additional categories could be used)
};
    enum SPATIAL_CONSTRAINT_TYPE
{
  Lane=0,
  MultiLane=1, (e.g., full road segment including adjacent same and/or opposing direction lanes)
  Intersection=2,
  Track=3, (other agents, like car, pedestrian, etc.)
. . . (alternate or additional categories could be used)
};
    struct CONSTRAINING_OBJECTS{
    bool trackExist; //!<if FALSE, trackInfo will be ignored
    SpeedConstraintTrackInfo trackInfo;
    bool mapObjectExist; //!<if FALSE, mapInfo will be ignored
    SpeedConstraintMapInfo mapInfo;
};
```

TrackInfo and MapInfo minimally contain unique identifiers (IDs). These IDs are used to look up further detailed attributes if necessary. For example, it can be desirable to retrieve further data related to track (object/agent) type classifications (pedestrian, vehicle, etc.), location, speed, etc. Map objects are similarly stored with unique identifiers, geometric, and relational properties. Some example map types which may partially describe a reason for AV stopping in MAP_TYPE enum as follows.

```
    enum MAP_TYPE
{
  CROSSWALK=0,
  STOPLINE=1,
  BOXJUNCTION=2,
  LANEDIVIDER=3,
. . . (alternate or additional categories could be used)
};
```

Figure 16:
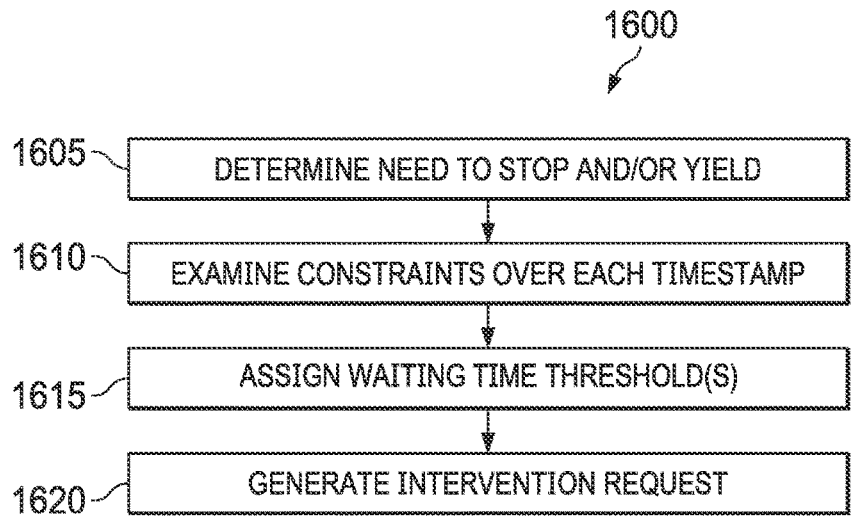
FIG. 16 is a flowchart of an example process related to immobility detection with situational context, in accordance with various embodiments.

FIG. 16 is a flowchart of an example process 1600 related to immobility detection with situational context, in accordance with various embodiments. Specifically, FIG. 16 depicts an example by which concepts herein can be described. It will be understood that the below-described example is intended only for the sake of discussion, and other examples include more, fewer, or different elements, constraints, thresholds, etc. In some embodiments, one or more of the elements described with respect to process 1600 are performed (e.g., completely, partially, and/or the like) by the system depicted in immobility detection pipeline 1500. Additionally, or alternatively, in some embodiments one or more elements described with respect to process 1600 are performed (e.g., completely, partially, and/or the like) by another device or group of devices separate from or the example OED framework 600 such as one or more of the devices of any of FIGS. 1, 2, 3, and 4.

The process 1600 includes determining, at 1605, a need by vehicle 200 to stop and/or yield. For example, based on a projected time for vehicle 200 to pass a crosswalk as compared to time for a nearby pedestrian to reach the crosswalk, a need for vehicle 200 to stop and yield to the pedestrian is determined. As a result, a speed constraint is imposed to dictate zero speed from 2 meters (m) prior to the crosswalk onwards (as measured along the AV path length). This constraint is published along with metadata specifying the constraint is caused by the particular crosswalk and pedestrian, along with each object's unique IDs. This constraint is republished for several timestamped iterations of planning system 404, immobility detection system 635, or some other system or subsystem.

The process 1600 further includes examining, at 1610, constraints over each timestamp (e.g., over each time-stamped iteration). Specifically, while there may be other constraints active that limit speed, spatial offset, etc., the crosswalk related constraint is identified as the primary constraint responsible for the immobility of vehicle 200 (zero speed constraint active at current position, other less relevant constraints potentially computed further along the path or if active at current position, dominated by the zero speed constraint thus similarly of lesser relevance). Based on metadata indicating a logical constraint type, including data related to an identified pedestrian and crosswalk, vehicle 200, and particularly constraint checking subsystem 1510, is configured to know stopping-reason 1520 for the current timestamp immobility.

Stopping-reason 1520 is output to timeout threshold generator 1525, and the process 1600 further includes assigning, at 1615, one or more waiting time threshold(s). Specifically, timeout threshold generator 1525 assigns different waiting time thresholds for different stopping-reasons or categories of stopping-reasons. For example, a waiting time threshold for yielding at a crosswalk can differ from a waiting time threshold for yielding to a jaywalker or some other category of stopping-reason. Waiting time threshold 1535 is output to immobility timer 1540 for processing. As immobility timer 1540 tracks the same stopping-reason persisting over sequential time steps, it compares current accumulated waiting times versus the waiting time threshold. If the accumulated waiting time exceeds the threshold, immobility detection system 635 determines the vehicle is "stuck". For example, it can be presumed that crosswalk users cross the road at a slower pace than jaywalkers, and hence have a longer time threshold. Or as a further refinement, if the crosswalk is a signaled crosswalk, immobility detection system 635 takes into account the typical duration of a "walk/green" signal, and not expect to wait much longer than that duration.

The process 1600 further includes generating, at 1620, an intervention request such as intervention request 612. Specifically, upon determination that the vehicle is stuck, a timeout satisfied trigger signal 1545 is output to the intervention request system 630, which generates an intervention request 612. Intervention request 612 can include the context of stopping-reason (e.g., stopping-reason data 613), which in this case includes an indication that the vehicle is waiting at an identified crosswalk for an identified pedestrian. This could be useful for the RVA operator to initiate an override for further progression. For example, if the identified pedestrian can be seen on a video feed and is apparently not intending to cross (conversing with another stationary person, waiting to cross in orthogonal direction, or some other visual indication), the operator may choose to lift the constraint, send an acceleration command, or use some other means to send the vehicle through the crosswalk regardless. Or similarly, the perception system may have falsely classified a nearby sign or mailbox as a pedestrian, where similar visual affirmation and override could be employed. Note that these intervention means may not be obvious without the context that the pedestrian at the crosswalk is the cause for the immobility, and also the chosen intervention mechanism would be different for other immobility reasons (e.g., avoidance of a static or slow jaywalker could require path change).

Figure 17:
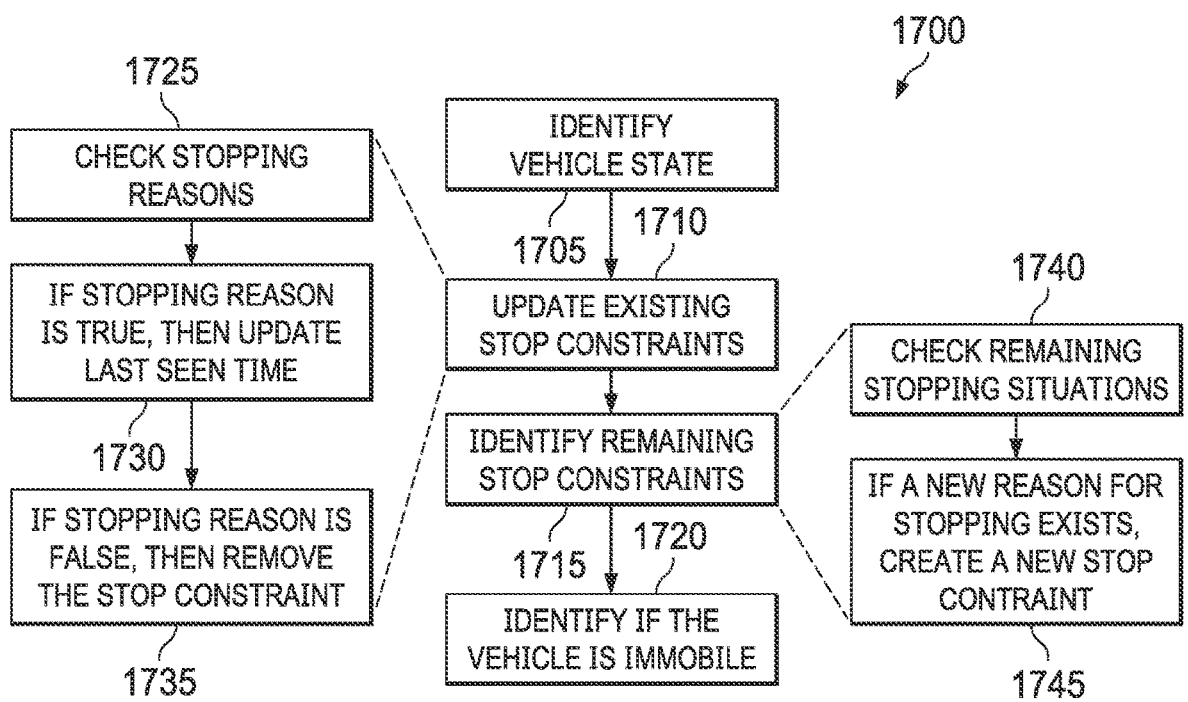
FIG. 17 is a flowchart of an alternative example process related to immobility detection with situational context, in accordance with various embodiments.

Referring to FIG. 17, FIG. 17 is a flowchart of an alternative example process 1700 related to immobility detection with situational context, in accordance with various embodiments. Specifically, FIG. 17 depicts a process 1700 related to, and can be performed by, the immobility timer 1540 and/or the constraint checking subsystem 1510. In some embodiments, one or more of the elements described with respect to process 700 are performed (e.g., completely, partially, and/or the like) by immobility detection pipeline 1500. Additionally, or alternatively, in some embodiments one or more elements described with respect to process 1700 are performed (e.g., completely, partially, and/or the like) by another device or group of devices separate from or the immobility detection pipeline 1500 such as one or more of the devices of any of FIGS. 1, 2, 3, and 4.

The process 1700 includes identifying, at 1705, a state of the vehicle. Such an identification includes of whether the vehicle has been previously identified as being immobile, whether there is data related to existing constraints or an existing stopping-reason, etc.

The process 1700 further includes updating, at 1710, existing constraints. Specifically, if an existing constraint is identified at 1705, then the stopping-reason(s) with which it is associated is checked at 1725. If the stopping-reason is true (e.g., if the stopping-reason still exists), then a "last seen time" field associated with the constraint or the stopping-reason is updated at 1730. If the stopping-reason is false (e.g., the stopping-reason does not exist anymore), then the stop constraint is removed at 1735 such that the immobility timer related to that specific stop constraint or stopping-reason is canceled.

The process 1700 further includes identifying, at 1715, remaining stop constraints. For example, the process includes checking, at 1740, whether there are any additional stopping situations. For example, the in this process the vehicle may already know of one situation that has required vehicle immobility (e.g., the pedestrian at the crosswalk as described above). However, the vehicle will identify, at 1740, whether there are any addition or new situations (e.g., an additional pedestrian at the crosswalk, or a car that is about to enter an intersection) that will generate a new stop constraint, at 1745.

The process 1700 further includes identifying, at 1720, that the vehicle is immobile or stuck. Such an identification occurs after the expiration of timeout threshold 1535 and results in generating and transmitting trigger signal 1545 to intervention request system 630.

Figure 18:
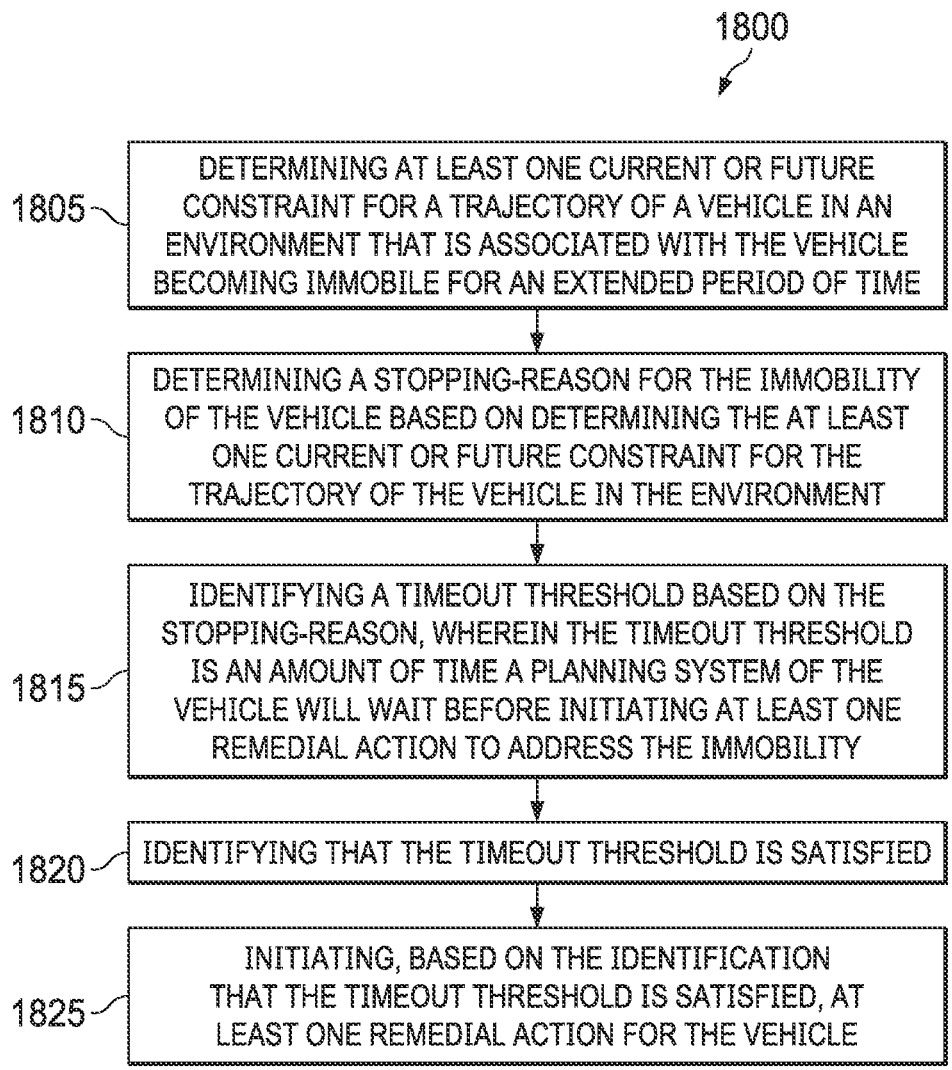
FIG. 18 is a flowchart of an alternative example process related to immobility detection with situational context, in accordance with various embodiments.

Referring to FIG. 18, FIG. 18 is a flowchart of an alternative example process 1800 related to immobility detection with situational context, in accordance with various embodiments. In some embodiments, one or more of the elements described with respect to process 1800 are performed (e.g., completely, partially, and/or the like) by immobility detection pipeline 1500. Additionally, or alternatively, in some embodiments one or more elements described with respect to process 1800 are performed (e.g., completely, partially, and/or the like) by another device or group of devices separate from or immobility detection pipeline 1500 such as one or more of the devices of any of FIGS. 1, 2, 3, and 4.

The process 1800 includes determining, at 1805, at least one current or future constraint for a trajectory of a vehicle in an environment that is associated with the vehicle becoming immobile for an extended period of time. As noted, the constraint relates to a spatial, velocity, or temporal constraint of the vehicle, or some other constraint. The constraint is a constraint of a trajectory that has resulted or will result in the vehicle becoming immobile.

The process 1800 further includes determining, at 1810, a stopping-reason for the immobility of vehicle 200 based on determining the at least one current or future constraint for the trajectory of the vehicle in the environment. As noted, the stopping-reason is a reason for the mobility. Examples of stopping-reasons include vehicle 200 waiting at a traffic light, a pedestrian/jaywalker crossing a crosswalk, a vehicle waiting at an intersection without a traffic light, an accident that involves or is proximate to the vehicle, a parked vehicle, yielding to another vehicle that does not have intent to proceed, or some other stopping-reason. In an embodiment, determining the stopping-reason includes identifying a first time and a last time the vehicle became immobile due to the at least one current or future constraint. In an embodiment, the stopping-reason includes an identifier associated with at least one object or map constraint.

The process 1800 further includes identifying, at 1815, a timeout threshold based on the stopping-reason. The timeout threshold is an amount of time a system of the vehicle (e.g., the intervention request system 630) will wait before initiating at least one remedial action to address the immobility. In an embodiment, element 1815 optionally further includes determining, based on the stopping-reason, that the stopping-reason is associated with one of a first set of stopping-reasons and a second set of stopping-reasons. In this embodiment, the first set of stopping-reasons are stopping-reasons in which the mobility is expected to resolve, and the second set of stopping-reasons are stopping-reasons in which the mobility is expected to not resolve. The timeout threshold is then identified based on whether the stopping-reason is in the first set of stopping-reasons or the second set of stopping-reasons. The timeout threshold can be based on a nominal traffic light wait time, a nominal pedestrian or jaywalker walking speed, a number of vehicles in front of the AV, a nominal wait time (which can be less than or equal to one second in situations in which the immobility is not expected to resolve), a predetermined wait time, etc. In an embodiment the timeout threshold is dependent on a risk associated with the vehicle being immobile for an extended period of time, for example a risk of obstructing cross-traffic. The remedial action can include generating a new route for the vehicle, generating a new trajectory that circumvents a stopped object, removing a constraint related to a vehicle or pedestrian that is identified as not having intent to proceed, reporting to an RVA assistant that the vehicle is immobile (along with a reason and/or duration of the mobility) etc.

The technique 1800 further includes identifying, at 1820, that the timeout threshold is satisfied, e.g. as described above with respect to the immobility timer 1540 and the trigger signal data 614. The technique 1800 further includes initiating, at 1825 based on the identification that the timeout threshold is satisfied, at least one remedial action for the vehicle such as intervention request 612.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method comprising:
    determining, with at least one processor, a trajectory for a vehicle based on a location of the vehicle and sensor data associated with at least one sensor;
    determining, with the at least one processor, whether the trajectory is associated with at least one defined functional requirement; and
    in accordance with determining that the trajectory is associated with at least one defined functional requirement:
        determining, with the at least one processor, a first level of risk of non-compliance of the vehicle based on the at least one defined functional requirement and performance of the trajectory;
        generating, with the at least one processor, a minimum perception zone based on the trajectory;
        assessing, with the at least one processor, a second level of risk of non-compliance of the vehicle associated with performance of the trajectory by the vehicle based on the minimum perception zone;
        determining, with the at least one processor, a total level of risk based on a combination of the first level of risk and the second level of risk;
        determining, with the at least one processor, whether the total level of risk would place the vehicle in a safe state or an unsafe state;
            in accordance with the total level of risk placing the vehicle in a safe state, traversing the trajectory; and
            in accordance with the total level of risk placing the vehicle in an unsafe state, requesting an intervention to place the vehicle in a safe state.

2. The method of claim 1, further comprising:
    requesting an intervention to place the vehicle in a safe state based on determining that the trajectory is not associated with at least one defined functional requirement.

3. The method of claim 1, wherein the first level of risk is based on a perception visibility model for a region of interest that indicates a probability that an object detection in the sensor data is visible to at least one sensor of the vehicle in the region of interest, and
    wherein assessing the first level of risk comprises:
        assessing the first level of risk based on the probability that the object is visible to the at least one sensor of the vehicle in the region of interest.

4. The method of claim 3, wherein determining a first level of risk of non-compliance of the vehicle with the at least one defined functional requirement if the vehicle traverses the trajectory, further comprises:
    determining whether at least one quantitative metric associated with the defined functional requirements is satisfied.

5. The method of claim 4, wherein the at least one quantitative metric is associated with at least one regulatory rule, safety rule, or passenger comfort rule.

6. The method of claim 3, wherein the perception visibility model is based on at least one prior perception visibility model.

7. The method of claim 3, wherein the probability is determined based on sensor condition data associated with an operational state of the at least one sensor of the vehicle.

8. The method of claim 7, wherein the operational state indicates whether a field of view of the at least one sensor is occluded.

9. The method of claim 7, wherein the operational state indicates whether the at least one sensor has malfunctioned.

10. The method of claim 3, wherein the probability is determined based on at least one environmental condition.

11. The method of claim 10, wherein the at least one environmental condition is a weather condition.

12. The method of claim 10, wherein the at least one environmental condition is an illumination condition.

13. The method of claim 1, wherein the intervention is a minimum risk maneuver.

14. The method of claim 1, further comprising:
    receiving, based on requesting the intervention, data associated with control of the vehicle, wherein the data is configured to cause the vehicle to take one or more actions.

15. The method of claim 1, wherein the minimum perception zone is based on the trajectory.

16. A system comprising:
    at least one processor; and
    at least one non-transitory computer-readable media comprising instructions that, upon execution of the instructions by the at least one processor, cause a vehicle to perform operations comprising:
        determining a trajectory for a vehicle based on a location of the vehicle and sensor data associated with at least one sensor;
        determining whether the trajectory is associated with at least one defined functional requirement; and
        in accordance with determining that the trajectory is associated with at least one defined functional requirement:
            determining a first level of risk of non-compliance of the vehicle based on the at least one defined functional requirement and performance of the trajectory;

generating a minimum perception zone based on the trajectory;

assessing a second level of risk of non-compliance of the vehicle associated with performance of the trajectory by the vehicle based on the minimum perception zone;

determining a total level of risk based on a combination of the first level of risk and the second level of risk;

determining whether the total level of risk would place the vehicle in a safe state or an unsafe state;

in accordance with the total level of risk placing the vehicle in a safe state, traversing the trajectory; and in accordance with the total level of risk placing the vehicle in an unsafe state, requesting an intervention to place the vehicle in a safe state.

17. The system of claim 16, further comprising:

requesting an intervention to place the vehicle in a safe state based on determining that the trajectory is not associated with at least one defined functional requirement.

18. The system of claim 16, wherein the first level of risk is based on a perception visibility model for a region of interest that indicates a probability that an object detection in the sensor data is visible to at least one sensor of the vehicle in the region of interest, and wherein assessing the first level of risk comprises:

assessing the first level of risk based on the probability that the object detection is visible to the at least one sensor of the vehicle in the region of interest.

19. The system of claim 18, wherein determining a first level of risk of non-compliance of the vehicle with the at least one defined functional requirement if the vehicle traverses the trajectory, further comprises:

determining whether at least one quantitative metric associated with the defined functional requirements is satisfied.

20. The system of claim 19, wherein the at least one quantitative metric is associated with at least one regulatory rule, safety rule, or passenger comfort rule.

* * * * *